United States Patent [19]

Pauker et al.

[11] 4,040,028
[45] Aug. 2, 1977

[54] DATA PROCESSING SYSTEM COMPRISING INPUT/OUTPUT PROCESSORS

[75] Inventors: Mira Pauker, Bievres; Jean Gobert, Gentilly; Denis Pottier, Antony; Louis Quere, Sceaux, all of France

[73] Assignee: U.S. Philips Corporation, New York, N.Y.

[21] Appl. No.: 581,708

[22] Filed: May 28, 1975

[30] Foreign Application Priority Data

May 28, 1974 France ................. 74.18468

[51] Int. Cl.² .............. G06F 3/02; G06F 9/18
[52] U.S. Cl. ...................................... 364/900
[58] Field of Search ............ 340/172.5; 445/1

[56] References Cited

U.S. PATENT DOCUMENTS

| | | | |
|---|---|---|---|
| 3,061,192 | 10/1962 | Terzian | 340/172.5 |
| 3,518,632 | 6/1970 | Threadgold et al. | 340/172.5 |
| 3,544,973 | 12/1970 | Borck et al. | 340/172.5 |
| 3,593,300 | 7/1971 | Driscoll et al. | 340/172.5 |
| 3,638,195 | 1/1972 | Brender et al. | 340/172.5 |
| 3,710,324 | 1/1973 | Cohen et al. | 340/172.5 |
| 3,728,693 | 4/1973 | Macker et al. | 340/172.5 |
| 3,761,879 | 9/1973 | Brandsma et al. | 340/172.5 |
| 3,813,648 | 5/1974 | Huber | 340/172.5 |
| 3,828,325 | 8/1974 | Stafford et al. | 340/172.5 |
| 3,934,232 | 1/1976 | Curley | 340/172.5 |
| 3,940,743 | 2/1976 | Fitzgerald | 340/172.5 |
| 3,959,775 | 5/1976 | Valassis et al. | 340/172.5 |

*Primary Examiner*—Gareth D. Shaw
*Assistant Examiner*—Jan E. Rhoads
*Attorney, Agent, or Firm*—Frank R. Trifari; Daniel R. McGlynn

[57] ABSTRACT

A data processing system, comprising a central unit, peripheral units, and input/output processors which are connected parallel to a common bus. The said processors centralize the exchanges between a plurality of peripheral units and the store. The data exchanges can be effected in the mode "programmed bus", in which the central unit is the master of the system, or by way of the "multiplex bus", where the exchange is controlled by the input/output processor in word blocks. The interruption system utilizes a second bus which is independent of the first bus, so that the simultaneous transfer of the interruption vectors and data is possible.

5 Claims, 22 Drawing Figures

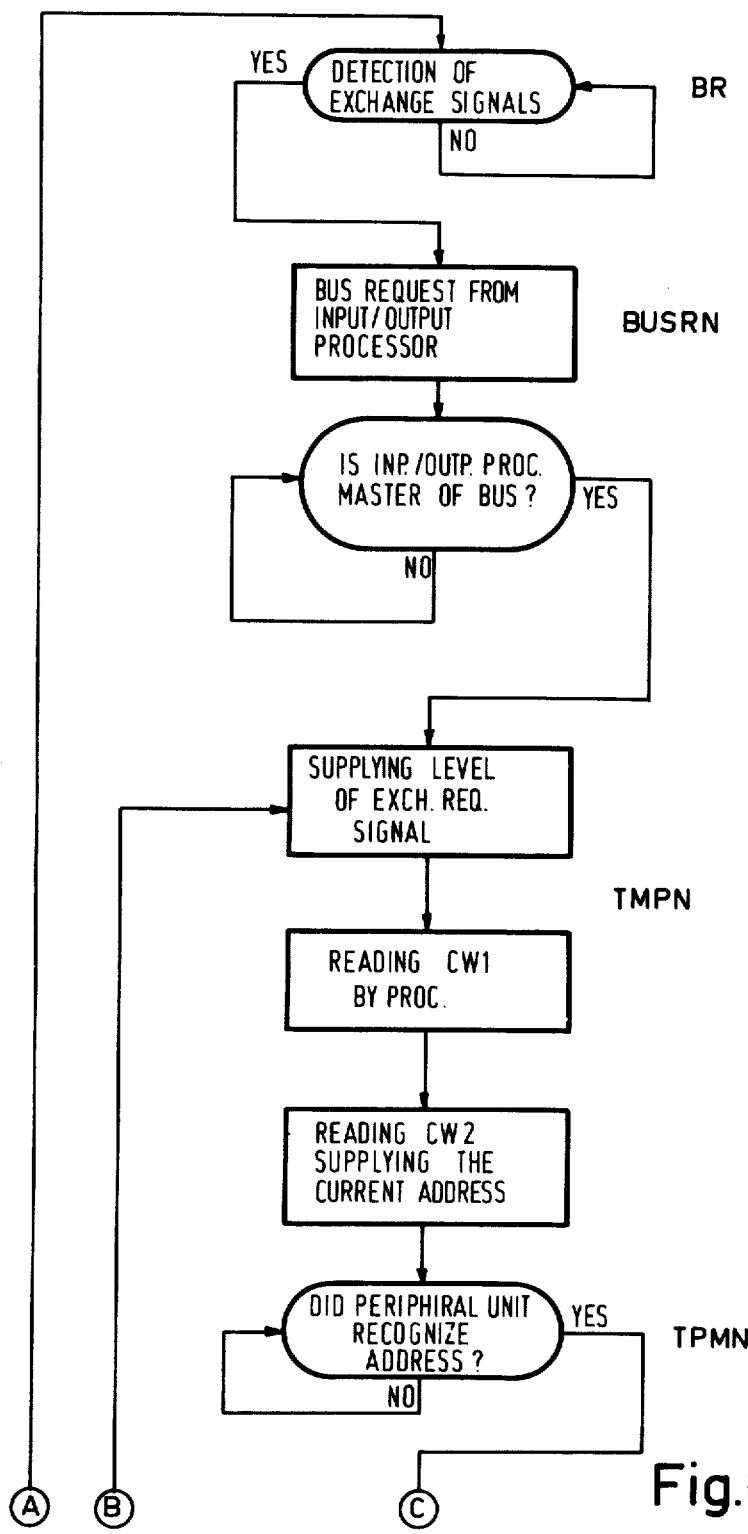

DATA PROCESSING SYSTEM COMPRISING INPUT/OUTPUT PROCESSORS

SUMMARY OF THE INVENTION

The present invention relates to data processing system, comprising at least one central processor for processing and controlling the information, at least one random-access store, and at least one group of peripheral units, all said units being connected parallel to a common bus on which the address information, control information and data are transferred.

At present in the design of computers the emphasis often lies on the buses between the various units of the system. This is because a bus is a very attractive proposition for the designers of computers in view of the large number of peripheral units that can be connected thereto, the customer thus also having a freedom in choosing the desired configuration. Such a bus permits a high flexibility in the design of the system. One of the possibilities of such a system consists in the parallel connection of all peripheral units to the said bus, each of these peripheral units being capable of controlling the bus and being connectable to any other unit. The first unit which controls the bus is referred to as "master", while the second unit transmits of receives data only under the command of the master is referred to as "slave". In such a known system, any peripheral unit and the central unit can act on the one hand as a bus master unit, and on the other hand as a slave unit. However, the central store of the system can act only as a slave unit.

The special aspect of such a system, however, is the fact tht peripheral units such as a printing device, receiving exclusively data from the store, must definitely be able to be master of the bus. After transfer of data between the store and this unit, this unit, like the printing device must signal the central unit that the printing (for example, of a line) has been correctly performed. To this end, the said peripheral unit must transmit an interruption vector to the central unit, and the transmission of this interruption vector on the data lines can be effected only if the printing device has taken over the control over the bus. Consequently, this implies that each peripheral unit should comprise additional means.

A system of this kind is simple indeed, but the additional means required for its manufacture imply a higher cost price of each unit. Furthermore, the fact that the interruption vectors must each time be transmitted via this bus, implies a very high degree of occupation of the said bus at the expense of actual data transmission.

These drawbacks are avoided in the data processing system according to the invention. To this end, the data processing system according to the invention is characterized in that it also comprises at least one unit for processing the input/output commands, the said unit also being connected parallel to the said bus and controlling the exchange of data from or to the peripheral units of such a group of peripheral units, the said central unit and the unit for processing the input/output commands each having a relative priority within the system for taking control over the bus, the said system furthermore comprising:

a. request means in the central unit and in the unit for processing the input/output commands, the said means generating a request signal in order to gain control over the bus, b. selection means in said bus which select the unit (having the highest priority) which has generated a request signal, the unit thus selected being the master of the system which controls the system, c. means in the central unit for initiating the exchanges, the said means successively initiating the unit for processing the input/output commands and the peripheral unit which will later be requested to perform a task by the program currently being executed in the central unit, d. means for requesting an exchange in each peripheral unit, the said means generating an exchange request signal for the said unit for processing the input/output commands, this signal being transmitted via a special line, e. detection means in the said unit for processing input/output commands, the said means detecting the exchange request signals originating from the peripheral units in order to generate, after detection of the presence of one (or more) of these signals, request so as to gain control over the bus, f. means in said unit for processing input/output commands for connecting, via the bus, a peripheral unit to the random-access store in order to execute and control a data transfer between these two units, g. interruption request means in each peripheral unit which, after completion of an information transfer to or from the said peripheral unit, generate an interruption signal in order to signal the central unit that the transfer has been completed.

It is to be noted that the fact that use is made of input/output processors for a group of peripheral units in such a system allows material to be saved by a relative centralization of such input/output Such input/output processors, used to control the data block tranfer between the central store and the peripheral units (multiplex-type transfer mode) according to the invention are units which are capable of being master of the bus. Therefore, one (or more) peripheral units should submit an exchange request to said input/output processor which is connected to each peripheral unit by way of a special exchange request line. Each of these lines is periodically scanned by the detection means for the detection of the presence of any exchange request signal. If so requested by one of the peripheral units, the corresponding input/output processor submits a bus request which is treated by the bus control device. If no other master unit of the system having a priority higher than the said input/output processor has simultaneously made a request for the bus, the said bus is assigned to the said input/output processor. This processor then successively addresses, via the address lines of the bus, the peripheral unit and subsequently the store. These two units are connected to each other, and the data exchange is effected directly between these two units via the bus under the control of the input/output processor.

It is a further aspect of the invention that the said system also comprises a separate interruption bus whereto the peripheral units and the central unit are parallel connected, each peripheral unit and the central unit having a relative priority in the system, each unit being capable of transmitting, at any instant, independent of what is happening on the bus, an interruption signal to the central unit, via the interruption bus, so as to interrupt the program currently being executed in the central unit, the task of the peripheral unit having the highest priority with respect to the central unit and the other peripheral units which have submitted an interruption request signal being executed first.

The end of a data exchange is signalled to the central unit by an interruption which is dispatched via the interruption lines of the interruption bus, to the said central unit. This interruption request can be made by a peripheral unit at any given instant, without the said peripheral unit having to take control over the bus, because the interruption vector is applied to the central unit via interruption lines which are not the data lines of the bus.

It is a further aspect yet of the invention that the central unit utilizes three different types of instruction to extend the possibilities of the system; this enables inter alia the maximum storage capacity to be utilized, while the peripheral units have their own addresses which differ from those of the store.

These three types of instructions consist of instructions of the arithmetical or logic, and instructions for the dialogues between the central unit and the store, i.e., the input/output dialogue instructions between the central unit and the peripheral units and the dialogue instructions between the central unit and the input/output processors. The latter provide the transfer of given parameters to the input/output processors where these parameters are required for the exchange between peripheral units and store. These parameters are stored in registers which are referred to as external registers and which are contained in the input/output processors. These parameters are the length of the data block to be transferred between the said units, the store address with which the transfer commences, the transfer mode (characters or words), and the transfer types (input/output command). It will be obvious that an input/output processor comprises an arithmatic unit for updating the length of the block yet to be transferred and the store address involved in the next transfer, and a sequence circuit which supplies the exchange signals and controls the various sections of the said processor.

The described advantages and other advantages of the system according to the invention will be described in detail hereinafter. One embodiment according to the invention will be described with reference to the Figures, but the invention is not restricted thereto.

BRIEF DESCRIPTION OF THE DRAWINGS

FIG. 5a shows the sequence circuit for an input/output processor;

FIG. 5b shows the selection circuit for selecting the operating mode of the sequence circuit;

FIG. 5c shows the address recognition unit of the processors of FIG. 4a;

FIG. 5d shows the request unit of the processor of FIG. 4a for taking over the control of the bus;

FIG. 5e shows the detection unit for the exchange request originating from the peripheral units;

FIG. 5f shows the signals supplied by the various units in the mode "central unit";

FIG. 5g shows the signals supplied by the various units in the mode "sampling";

FIG. 5h shows the signals supplied by the various units in the mode "CW1 exchange";

FIG. 5i shows the signals supplied by the various units in the mode "CW2 exchange";

DETAILED DESCRIPTION

Figure 1:
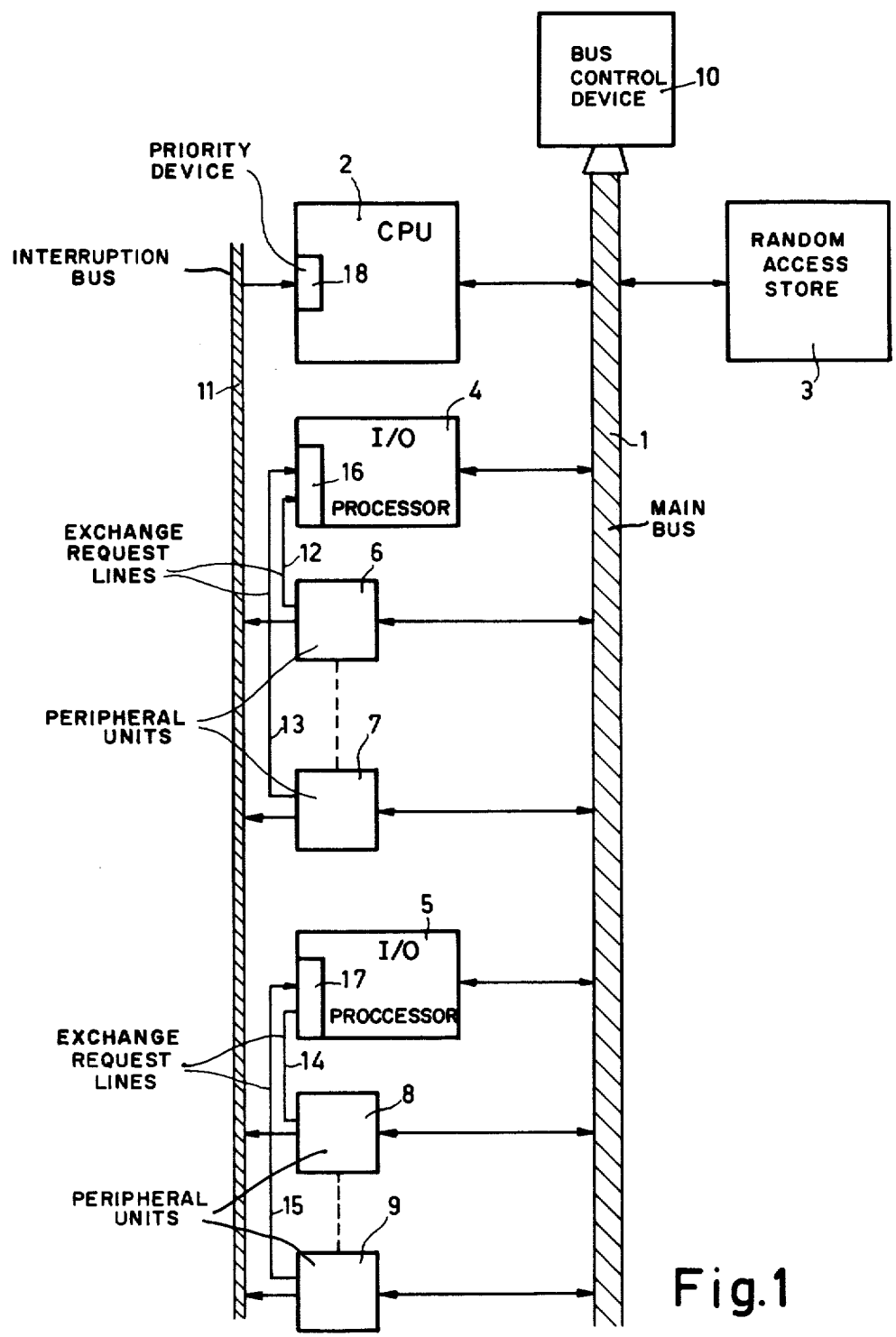
FIG. 1 shows a general diagram of the system.

In FIG. 1 all elements are connected parallel to a bus 1: a central unit 2, a random-access store 3, a first input/output processor 4, a second input/output processor 5, and peripheral units 6, 7, 8 and 9, while on one end of the said bus 1 a bus control device 10 is arranged (this device may form part of the central unit 2). The second bus 11, referred to hereinafter as the "interruption bus", connects the peripheral units 6, 7, 8 and 9 to the central unit 2 via the priority device 18. The said peripheral units are connected to one of the input/output processors 4 or 5 by way of exchange request lines of the type 12, 13, 14 or 15 (in practice, the number of such processors is not limited to two). The two peripheral units 6 and 7 are connected, via the exchange request lines 12 and 13, respectively, to processor 4 by means of the exchange request detection device 16, while the peripheral units 8 and 9 are connected via the exchange request lines 14 and 15, respectively, to processor 5 by means of the exchange request detection device 17.

Each of the elements of this Figure will be described in detail reference to the subsequent Figures. However, a general description of the operation of the system is necessary before the details of each section can be elaborated.

The general purpose of such a data processing system is to process the data stored in the storage system and to transfer these data to the peripheral units or to receive new information from these units for later processing. Consequently, two parts can be distinguished in these procedures:

The first part which consists of the execution of data transfers between the peripheral units and the store.

The second part which consists of the treatment and processing of the data.

In the structure of the system, this leads to the separation of the data transfer which is assigned to the input/output processors 4 and 5, and the treatment and processing which is assigned to the central unit 2. Because all units are connected parallel to bus 1, it is necessary to control the access to this bus; this function is performed by the bus control device 10.

Via this bus 1, data, address information and control information are transferred, while on the interruption bus 11 interrupt requests as regards the current program in the central unit are transferred from the peripheral units to the central unit.

The operation of this system can be summarized as follows: In the central unit a program is executed, i.e., instructions present in the store have to be transferred to the said central unit. It is assumed that (at least one) peripheral unit has been initiated by the central unit by means of a CIO instruction Start (see below).

The central unit 2 requests the bus control device 10 for control of the bus 1. If this request is granted, the central unit 2 requests the store 3 to supply the central unit, via the bus data lines 1, with the contents of a storage word, the address of which is given by the program counter of the central unit 2. When these contents are present in the central unit 2, this unit transfers the control of the bus 1 to another unit which will be selected by the control unit 10. The central unit then starts to execute the instruction found.

If at this instant a peripheral unit (for example, unit 6) is ready to transfer (or receive) data in the store 3, the said unit 6 dispatches, via line 12, an exchange request signal which is detected by the exchange detection device 16. The input/output processor 4 then dispatches a request to obtain control over the bus to the bus control device 10. If this request is granted, processor 4 (initially initiated by means of an instruction WER by the central unit 2 in a manner which will yet be described) successively addresses, via the bus data lines, the peripheral unit 6 and the store 3 so as to connect these to each other. The said processor enables the peripheral unit (or the store), which has first been initiated by the central unit 2 in a manner which will yet be described, to dispatch its information via the bus data lines 1, this information being arranged in the store 3 (or in the peripheral unit) at an address which is determined by the processor 4.

At the end of the data transfer (a block comprising several words can thus be transferred between the peripheral unit 6 and the store 3), the peripheral unit dispatches, via the interruption bus 11, an interruption request to the central unit 2 to signal the central unit that the transfer has been completed. The current instruction is then terminated and, by means of the priority device 18, it is then determined whether the peripheral unit has a priority higher than that of the current program. If so, the central unit 2 performs an interruption program for the benefit of the peripheral unit 6, the said program consisting on the one hand of checking that the transfer has been performed in the correct manner, and on the other hand of setting the peripheral unit 6 to the non-active state (instruction SST, see dsecription below), the said peripheral unit being capable of performing other transfers as of this instant, if so requested, after it has been initiated again by the central unit (CIO instruction start).

For a better explanation of the operation of the data processing system, the following points will be successively considered:

Bus and signals transferred on this bus;
Method of requesting control over the bus by the masters of the system, three of which are present in the example of FIG. 1:
The central unit 2
The input/output processor 4
The input/output processor 5.

This example will be described notably with reference to FIGS. 2a and 2b.

Central unit 2, which normally controls the system and which serves to supply the input/output processors with the data which enable input/output commands to be executed, and which supplies the peripheral units with start in instructions or start instructions for the input/output operations. The said central unit should also complete the current program. These three types of operations correspond to three different types of instruction which are executed by the central unit and which will be described with reference to FIGS. 3a, 3b, 3c, 4d and 3e.

Input/output processor and exchange of data controlled by the said processor: if an input/output processor has been initiated by the central unit 2 and if a peripheral unit (also initiated by the central unit 2) signals the said processor that it is ready to perform a transfer, the input/output processor itself should gain control over the bus and provide the execution of this transfer. This example will be described with reference to FIGS. 4a and 4b, while a detailed embodiment of the said processor will be described with reference to FIGS. 5a and 5i.

BUS AND SIGNALS TRANSFERRED VIA THIS BUS

The bus 1 of FIG. 1 comprises a system of lines (not shown in detail in FIG. 1 for the simplicity of the drawing, but shown in detail in FIG. 3a):

The 18 address lines MAD which enable the addressing of:
the store 3 (128 k words of 16 bits at the most)
input/output processors such as 4 and 5
peripheral units such as 6, 7, 8 and 9.
The 16 data lines BIO which transfer the data exchanged by these two units;
The lines for determining the peiority among the masters of the system; these lines (five) carry the following signals (see FIG. 2):

SPYC: signal which is supplied by the bus control device 10 and which is received by all masters of the bus. This signal serves to request the masters to prepare themselves for the determination of the new master of the bus.

BSYN: signal which is supplied by one of the masters and which is received by all other masters, notably by the central unit 2; the signal indicates that the bus is occupied.

MSN: signal supplied by a master and received by the other masters, whereby the former master indicates that a new bus master has been selected.

BUSRN: signal supplied by a master to request control over the bus, and been received by the bus control device 10.

O.K.: signal supplied at the beginning by the bus control device, its logic level indicating whether a master whereby it has been received and transmitted again gas or has not requested control over the bus. For the sake of simplicity, this signal will be referred to as OKI when it enters a master, and OKO when it appears on the output of a master (for more details, see FIG. 2a).

Figure 5A:
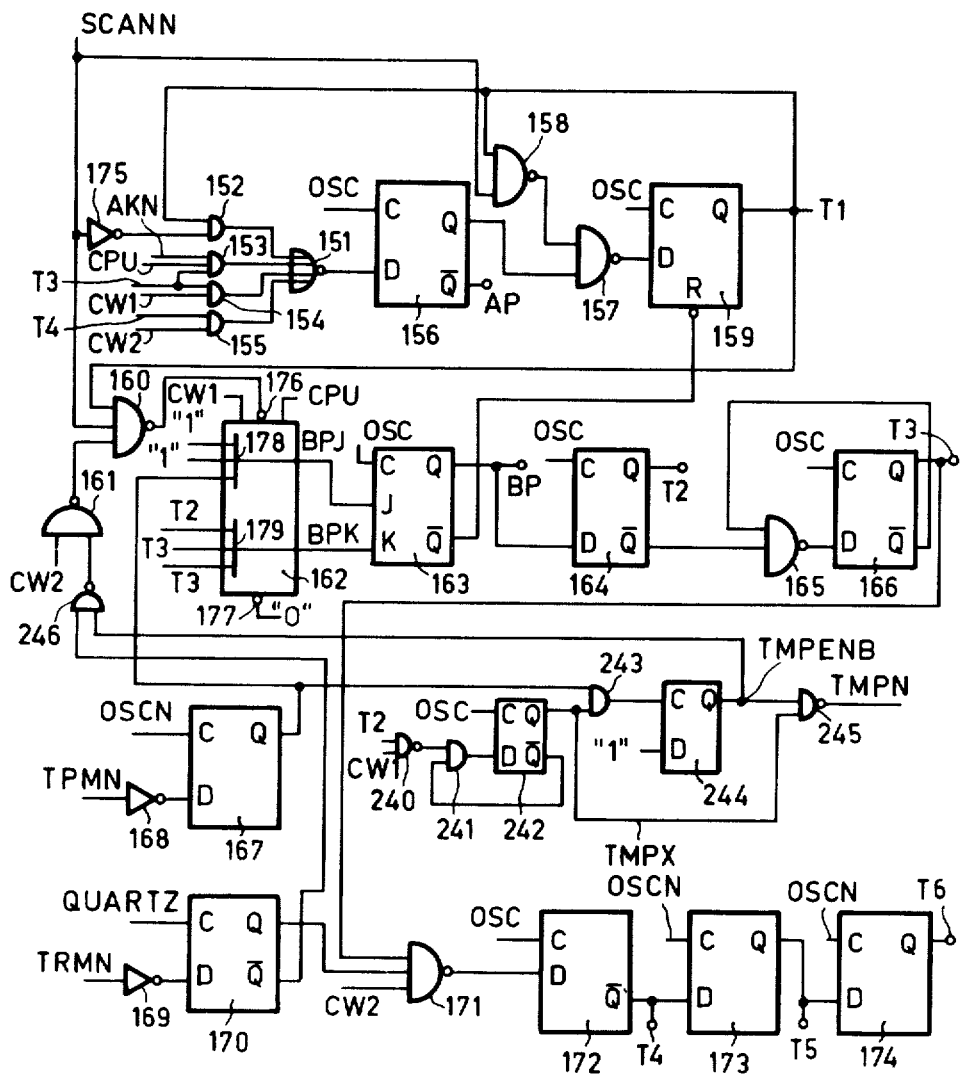
FIGS. 5a to 5i show detail diagrams of various sections of an input/output processor as shown in FIG. 4a, and diagrams which illustrate the signals exchanged by the various units of the system.
Figure 5B:
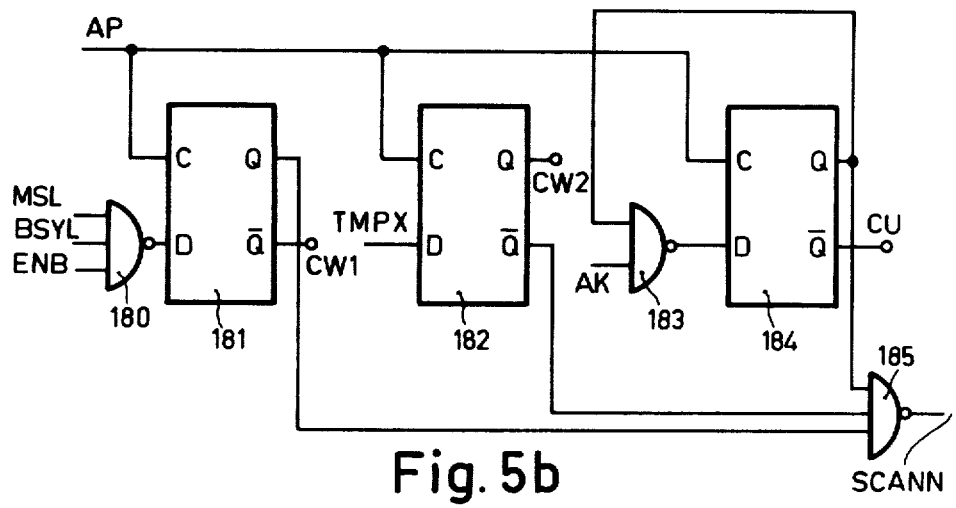
Figure 5C:
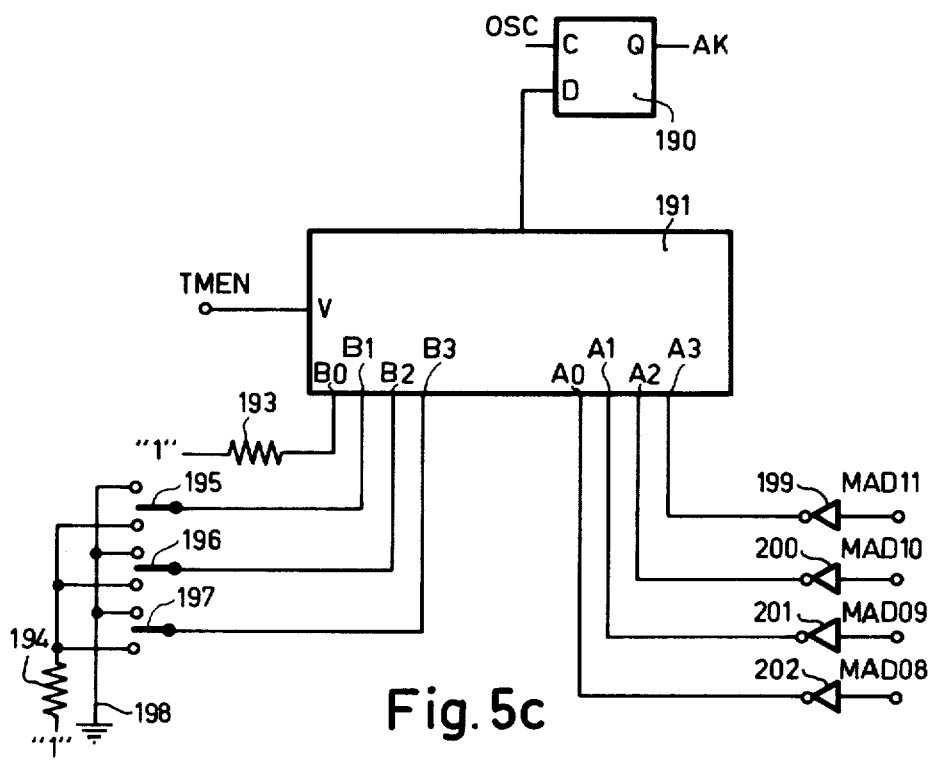
Figure 5D:
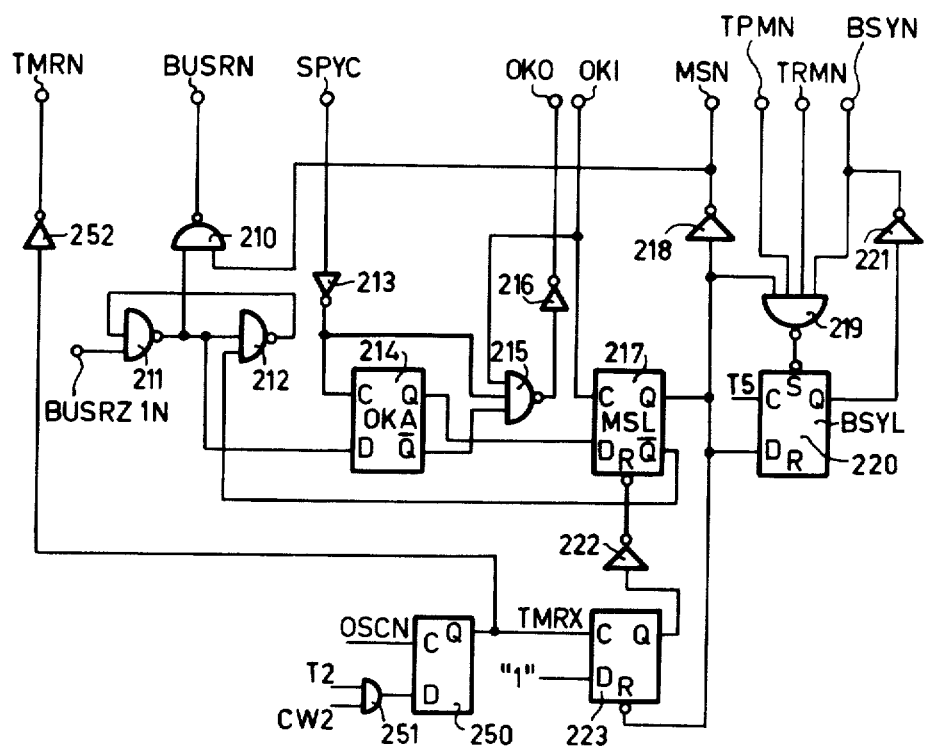

The synchronization signal lines:

TMRN: rhythm signal which is supplied by a master for access to the store; its function is to validate the addresses and the storage data (see FIG. 5d).

TMEN: rhythm signal which is transmitted by a master to a peripheral unit; its function is to validate the address of a peripheral unit and to initiate an exchange with the said peripheral unit (FIG. 5a).

TMEN: rhythm signal which is transmitted by the central unit and which is received by an input/output processor; its function is to validate the address or the data supplied to the processor by the central unit during the initiating of the processor (FIG. 5c).

TRMN: reply signal to one of the signals TMEN or TMRN; its function, in the case of a read operation in the store, consists of validating the data supplied by the store. In all cases, this signal enables termination of the exchange (FIGS. 4b and 5c).

TPMN: reply signal to the signal TMPN; its function is to validate the reply of the peripheral unit and to terminate the current exchange (FIS. 3b and 5b).

The lines for the various test signals:

ARN (FIG. 3b): signal which is transmitted by the peripheral units and which signals the central unit that the said peripheral unit has recognized its address.

ACN (FI. 3b): signal which is transmitted by a peripheral unit and which signals that the function requested from this unit has been accepted by the said peripheral unit.

There are other test signals which are transmitted by the bus 1 and which will not be described herein because they are not necessary for a proper understanding of the invention. The function of these test signals is, for example, signalling the units that there is an interruption of the power supply.

The described bus signals enable exchanges of information to be made via this bus. Exchanges of this kind are always controlled by a master (in the example described in FIG. 1: the central unit 2, the input/output processors 4 and 5).

If the central unit participates in an exchange, it is always the master of the bus. However, an input/output processor can be addressed by the central unit and in that case it will behave as a "slave". In the case of an exchange of information between the peripheral unit and the store, an exchange which is controlled by an input/output processor, the input/output processor always acts as a master.

Whatever the type of exchange, the store and the peripheral units are always slaves.

This situation is summarized in the below table which also shows the rhythm signals exchanged by the masters and the slaves.

| Master of the exchange | Addressed element | Rhythm signal of the master of the exchange | Reply signals from the addressed elements |
| --- | --- | --- | --- |
| Central unit | Input/output processor | TMEN | TRMN |
| Central unit | Store | TMRN | TRMN |
| Central unit | Peripheral unit | TMPN | TPMN |
| Input/output processor | Store | TMRN | TRMN |
| Input/output processor | Peripheral unit | TMPN | TPMN |

METHOD OF REQUESTING THE CONTROL OVER THE BUS BY THE MASTERS OF THE SYSTEM

Figure 2A:
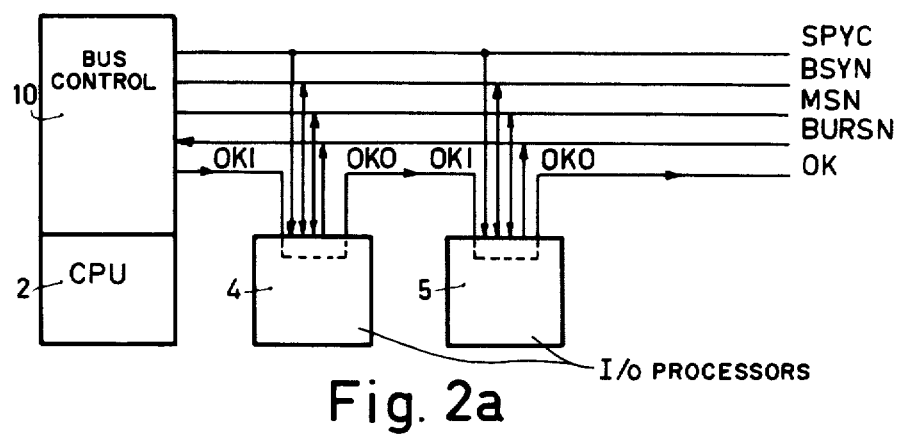
FIGS. 2a and 2b illustrate the selection of the master of the bus.
Figure 2B:
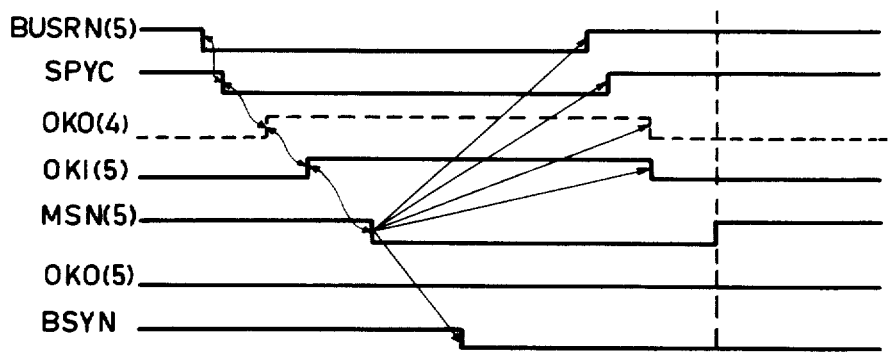

FIGS. 2a and 2b relate to the selection of of the master of the bus 1 by the bus control device 10.

In FIG. 2a, the bus control device 10 and the central unit 2 are represented by two adjoining rectangles; the bus control device 10 is actually only a part of the central unit 2. The bus control device 10 has inter alia connected thereto five bus lines 1 (not shown in the Figure) which transmit the following signals (previously defined):

SPYC - BSYN - MSN - BUSRN and OK.

Each master, with the exception of the central unit 2, such as the masters 4 and 5 which are input/output processors (see description of FIG. 1), is connected to bus 1 and thus receives or transmits, the five signals defined above.

The operation of this system will now be described in detail with reference to FIG. 2b which shows the variations of the logic levels of the signals shown in FIG. 2a as a functin of the time, these signals being derived from the input of a master connected to the bus. Hereinafter, it is to be understood that generally the signals having the level 0 or being low are active. In such a case the last part of their indication consists of a letter N. An exception in this respect is the signal SCAN which is active when it is high, the signal SCANN being active when it is "low".

It is assumed that the processor 5 requests the control over the bus 1.

When the signal MSN is at the high level (FIG. 2b), this processor has permission to transmit a request for the control over the bus to the bus control device 10; for this purpose it sets the signal BUSRN to 0 (FIG. 2b: BUSRN (5) means a signal BUSRN originating from the processor 5).

The bus control device 10, receiving this signal BUSRN, then transmits the signal SPYC to all masters, which order the masters 4 and 5 to prepare themselves for later selection. The bus control device 10 subsequently generates the signal OK, which arrives on the input of processor 4 in the form of a signal OKI. Because the processor 4 has not requested control over the bus, this signal OKI passes only through the processor 4 (broken line in FIG. 2a) and subsequently appears in the form of a signal OKO (4) which is shown in FIG. 2b. This signal OKO (4) is actually the signal OKI (5) for the processor 5, which has been shifted in time because of the delay time (FIG. 2b). This signal OKI (5) is received by the processor 5, which has submitted a request for control over the bus, and which blocks this signal and supplies the other masters possibly connected to the bus with a signal OKO (4) which is zero. The signal OKI (5) causes a reaction in the processor 5 which becomes apparent in that a signal MSN (5) is dispatched to the other masters of the system in order to signal these masters that the master of the next exchange on the bus has been selected. The processor 5 subsequently sets the signal BSYN to the level 0 to signal the other master that the bus is now occupied.

When the master thus selected is ready for the next selection, it supplies the signal MSN: the instant at which this signal returns to the logic level 1 corresponds to the instant at the beginning of the procedure of the selection of the master of the next exchange. This is because at this instant BUSRN is high, SPYC is high, OKI (5) is low, the totality of these conditions then causing the signal MSN to become high. The vertical broken line in FIG. 2b shows the instant as of which the selection of the master of the next exchange may commence. This selection of the new master is effected during the transmission of data under the control of the master of the current exchange.

As has already been described, the priority among the masters of the system is a consecutive (relative) priority at one level, which means that the master having the highest priority is the master which first receives the OK signal from the bus control device 10 etc., the master having the lowest priority level being the master which last receives this signal OK after it has passed through all other masters. A detailed embodiment of such a bus control request is shown in FIG. 5d.

For the remainder, the function of the central unit 2, which can be (and generally is) the master of the bus 1 is not further elaborated. In fact, this central unit 2 is the master having the lowest priority level, i.e., the said central unit 2 can control the bus only if the following triple condition is satisfied:

there is no other request for control over the bus 1, which means that the level of the signal BUSRN is high;

there is no selected master for the next exchange on the bus: the level of the signal MSN is high.

there is not current exchange on bus 1: the level of the signal BSYN is high.

If these three conditions are satisfied, the bus is automatically assigned to the central unit 2.

CENTRAL UNIT

Figure 3A:
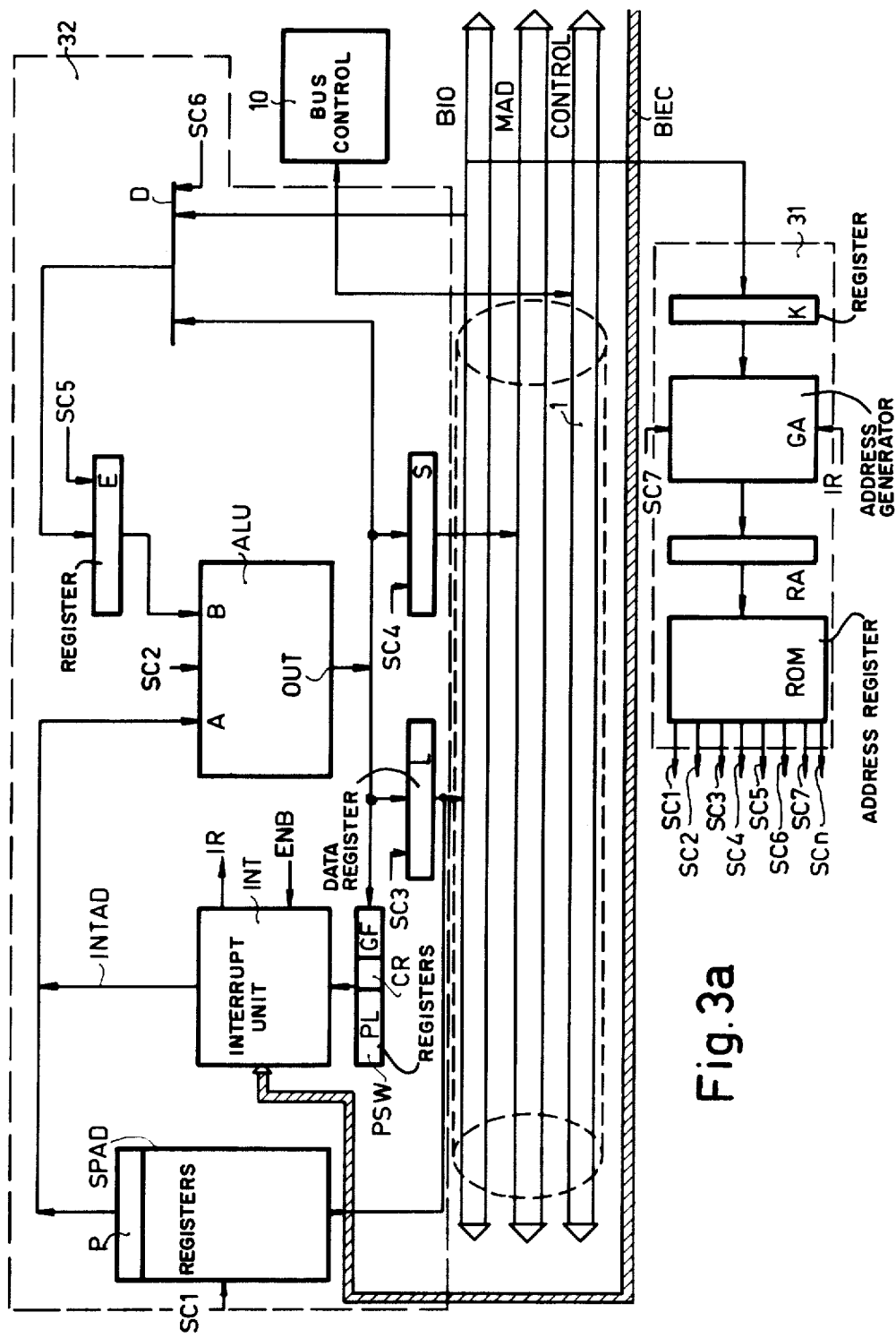
FIGS. 3a, 3b, 3c, 3d and 3e show the central unit, a peripheral unit, a diagram of the exchange of signals between said units, an organigram for an instruction, and an exchange organigram, respectively.

I - DESCRIPTION:

FIG. 3a shows the central unit of the system, i.e. the unit which normally controls the system. This unit essentially comprises two sections 31 and 32:

The first section 31 which generates the micro-programmed command signals;

The second section 32 which controls the processing of the information under the control of the micro-program commands.

The first section 31 comprises a register K which receives data originating from the lines BIO and which is connected to the address generator GA, on the other side of which the signals SC7 and IR (interruption signals) are received. The address generator GA itself is connected to the address register RA of the micro-program store ROM. This store supplies a number of elementary command signals SC1, SC2 ... SCn.

The second section 32 of this central unit comprises an arithmetic and logic unit ALU, comprising two inputs A and B and an output OUT; on the other side it is connected to the address register S which itself is connected, by way of the multiplexer D, to the address lines MAD and the register E, and on the other side it is connected to the data register L and to the program status word register PSW. This program status word register is subdivided into a register PL which indicates the level of the program, a condition register CR and a control register GF. The register PL is connected to the interruption system INT which receives the signals originating from the lines BIEC and the signal ENB (the interruption approval signal of the unit INT). This unit INT supplies an interruption signal IR to the address generator GA and is connected, by way of the lines INTAD and the generally used registers SPAD, to the input A of the arithmetic and logic unit ALU. The input B of the said unit ALU is connected to the output of the register E. Furthermore, the output of the data register L is connected to the data lines BIO and to the input of the set of registers SPAD.

In this FIG. 3a the control signal lines CONTROL, connected to the bus control device 10, are repeated.

The functions of the various units described above are as follows:

ARITHMETIC UNIT ALU:

This unit receives the information on inputs A and B; in this example, this information appears in the form of word operands of 16 bits. Using these two operands, this unit can perform an addition, a subtraction or a logic combination (AND-function) of these operands. The operations to be performed by ALU originate from the microprogram store ROM, designated by means of the connection SC2 (this connection in fact represents a number of separate wires).

THE SET OF REGISTERS SPAD

A set of 16 registers can be addressed by the set of instructions of the system. The reference P denotes the program counter of these registers; the reference R1 denotes one of the 16 registers SPAD; the reference R2 denotes another one of the 16 registers SPAD; and the reference R3 denotes one of the first eight registers SPAD. These registers are controlled via the microprogram store ROM under the control of the address generator GA by way of the (multi-wire) connection SCI. One of these registers, referred to as Ac or P, is the program counter which contains the address of the next instruction and which is advanced in steps of 2. Because the words have a length of 16 bits, it is necessary to be able to address either the left-hand portions or the right-hand portions of these words when operation in the "character" mode takes place (8 bits); the left-hand character then has an even address which is present in the program counter, and the right-hand character has an odd address, being the contents of the program counter plus 1.

STATUS WORD REGISTER PSW

This register is divided into three sections:

The program level register PL which contains the priority level of the current program (coded in 6 bits). This register is controlled by the priority system INT.

The condition register CR which indicates the state of the result. This register contains 2 bits which indicate the result of an operation: positive, negative, zero or incorrect.

The register GF which indicates the state at various points of the machine (using 8 bits): for example, one of these bits indicates whether or not the operation of the system may be interrupted (signal ENB).

REGISTER L

This register is an output buffer register of the unit ALU and is controlled by the store ROM (signal SC3), such that its contents are transferred, either to one of the registers of the unit SPAD or via the lines BIO.

REGISTER E

This is a generally used register which is included in the arithmetic loop between the output and the input B of the unit ALU. It simultaneously serves as an input buffer register, output buffer register and shift register. This register is controlled by the store ROM via the connection SC5.

MULTIPLEXER D

This is a multiplexer which can operate in four modes which are assigned thereto by the store ROM by way of SC6. These four modes are:

ALU output mode: the 16 bits originating from the unit ALU are transferred to the register E.

Output mode of the lines BIO: the 16 bits originating from the lines BIO are transferred to the register E.

Mode PL: the contents of the lines INTAD are transferred, via the input A, to the unit ALU, are shifted further to the left by the multiplexer D and are stored in the register E. The contents are subsequently applied, via the unit ALU, to the register PL.

Short constant mode: the eight right-hand bits of the instructions of the type T8 (described hereinafter) are transferred by the multiplexer D to the register E, logic 0 signals being generated so as to produce the eight left-hand bits of the 16-bits word.

REGISTER S

This register contains the address of the current instruction.

REGISTER K

This register contains the 16 bits of the current instruction, originating from the store 3 via the lines BIO of the bus 1.

ADDRESS GENERATOR GA

This unit receives the contents of the instruction to be carried out from the register K and, taken into account the state of the system (notably the signal IR), this unit codes the address in the store ROM of the microprogram instruction to be executed.

This address is coded using 9 bits which are transferred, via the set of lines SC7, to the address register RA of the store ROM.

REGISTER RA

Address register of the store ROM which enables the addressing of a micro-instruction.

STORE ROM

Control store of the central unit in which a microprogram is stored. Each microprogram word comprising 48 bits which have an effect in various points of the central unit by way of the connections SC1, SC2, . . . SCn.

II - THE INSTRUCTIONS

A. The various formats

For the continuation of the description of the central unit, it is now necessary to describe the various types of instruction which can be executed by the said central unit.

These instructions can have two types of format:

Format O: the format of the manipulation instructions for constants.

Format I: the format used for the operations from register to register, or for the operations with reference to the store.

I. - FORMAT O:

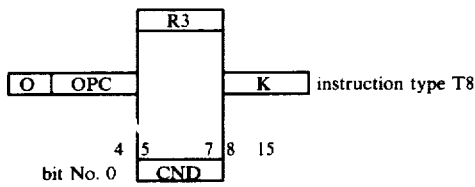

This type of instruction indicates by way of the bit 0 of the word that an instruction of the O-format is concerned (0 in this bit location). The bits 1 and 4 indicate the operation code OPC of the operation to be executed, while the bits 5 to 7 indicate, on the basis of the value of the operation code, either the number R3 of one of the 8 first registers of the set SPAD, or a condition CND to be veryfied by a current instruction.

This condition is a branched condition which indicates:

If the bit 5 equals 0: branching if the bits 6 and 7 equal the contents of the register CR of the status word PSW.

If the bit 5 equals 1: if the bits 6 and 7 differ from 1, branching occurs if they also differ from the contents of the register CR; if the bits 6 and 7 equal 1, there is unconditional branching.

The bits 8 to 15 of the instruction of the format O represent a constant:

2. - FORMAT I

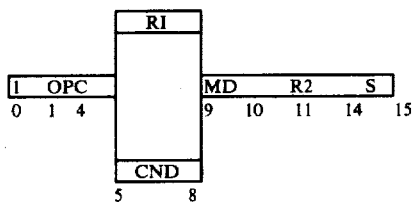

Instructions of the type T1000T7

Bit 0: equals 1 and indicates an instruction of the format I:

Bits 1 to 4: OPC; this is the operation code of the instruction to be executed;

Bits 5 to 8 indicate either a register R1, which is one of the 16 registers of SPAD, or the conditions in the bits 5 to 7 if so required by the operation code of the instruction.

Bits 9 to 10 MD: additional address bits.

Bits 11 to 14: indicate a register R2 (one of the 16 registers of SPAD relating to the second operand of the instruction).

Bit 15-S: indicates the location where the result of the operation is to be stored.

If S = 0, the result is stored in R1;

If S = 1, the result is stored in the store.

B. The three types of instruction which can be executed by the central unit.

Because the different types of instruction T1 to T8 which can be executed by the system have now been described, the operation of the central unit during the execution of the said instructions will now be described, the said instructions being subdivided into three separate categories:

The processing instructions of the central unit (type T1 to T8);

Input/output instructions via the programmed bus (type T8);

The initiating instructions of the external registers WER, RER, (type 8) (programmed bus).

I·) - THE PROCESSING INSTRUCTIONS OF THE CENTRAL UNIT (type T1 to T8)

Figure 3B:
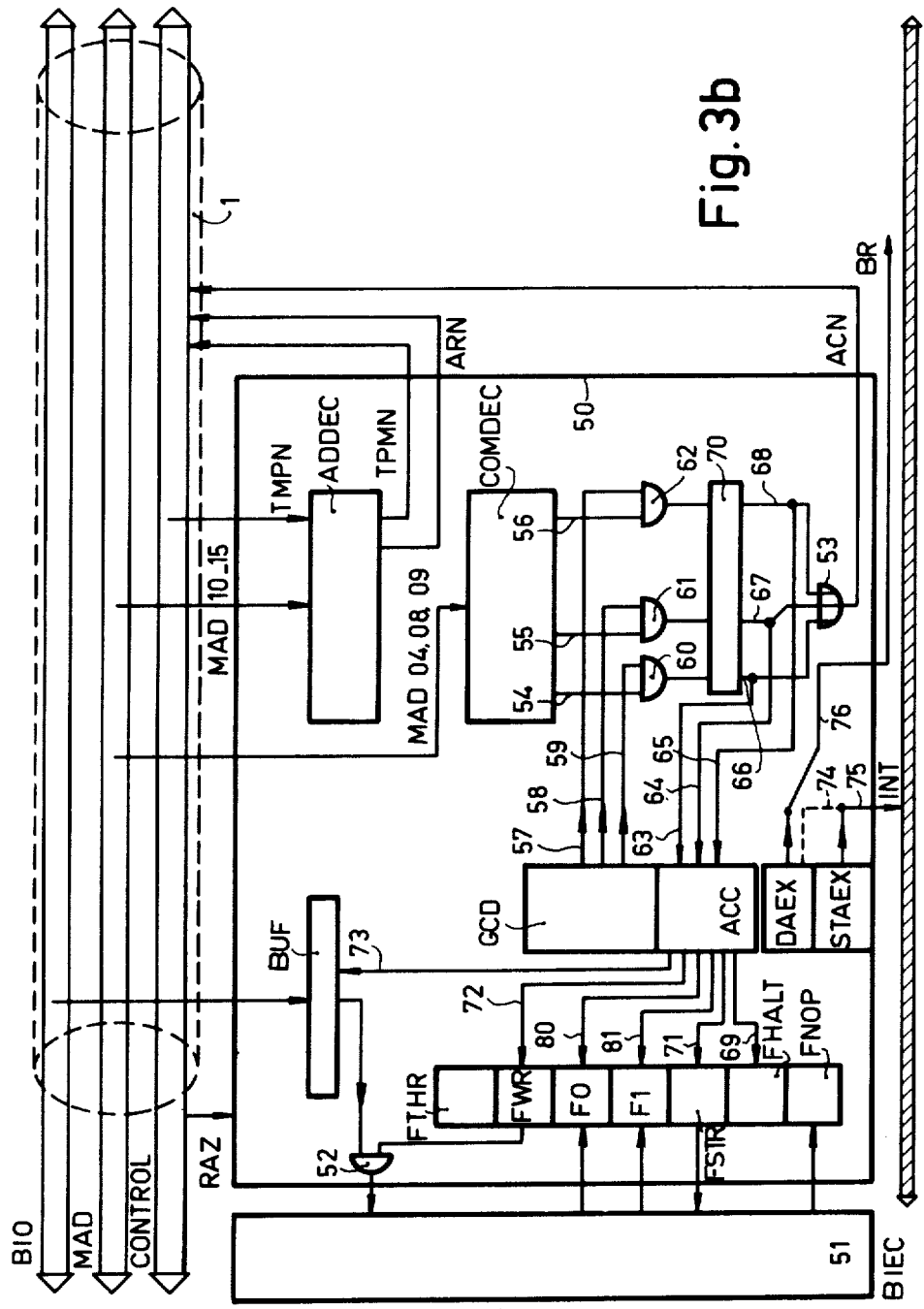
Figure 3C:
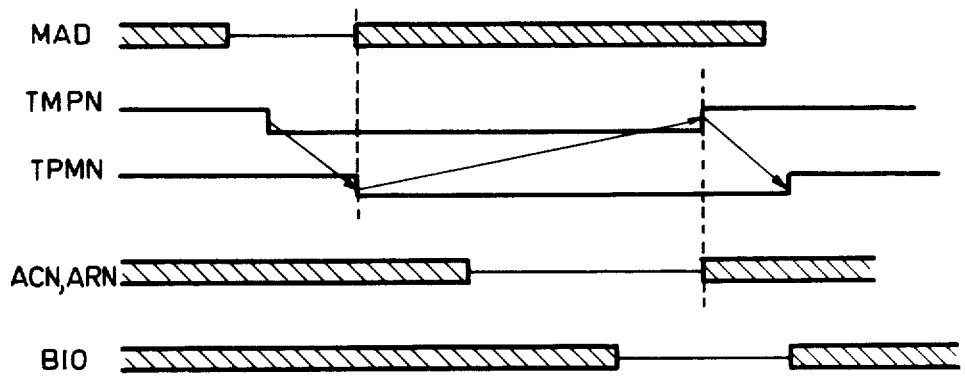
Figure 3D:
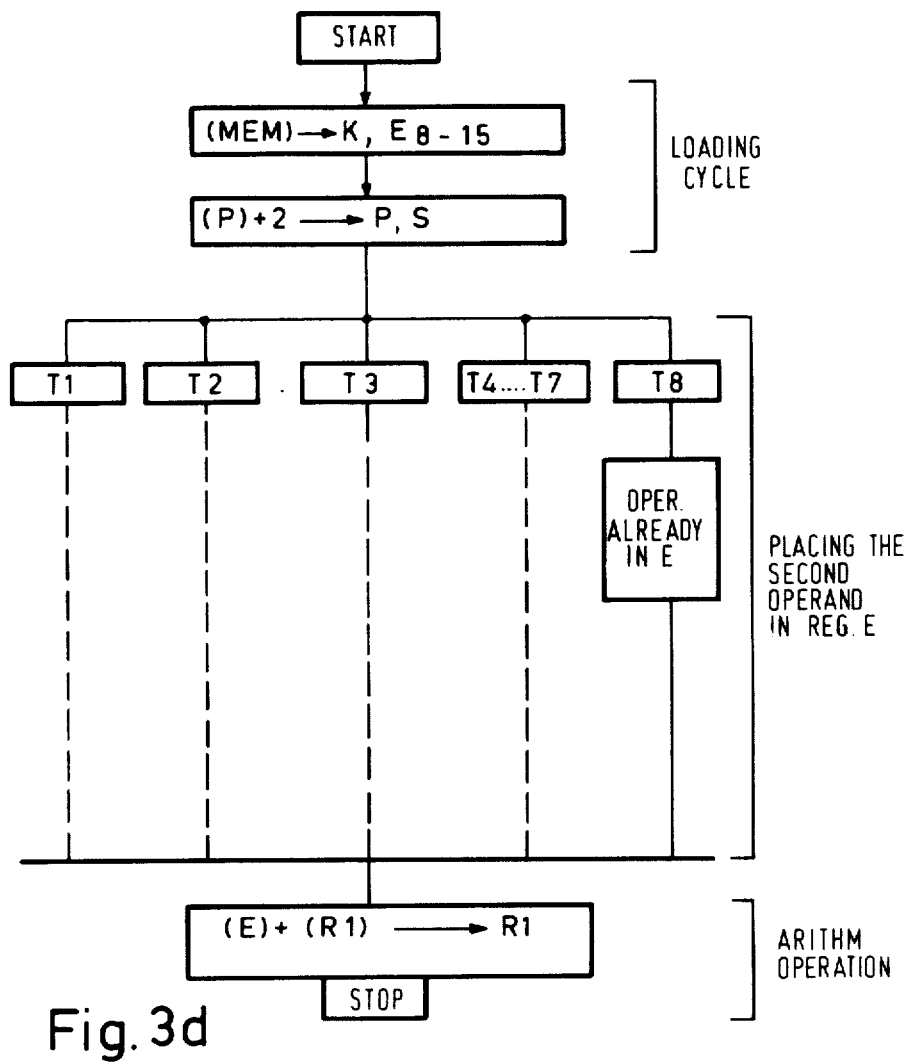

An example of the execution of such an instruction is shown in FIG. 3d, notably an adding instruction of the type T8; the other types of instruction which can be executed by the central unit are not necessary for a proper understanding of the invention, so they will not be elaborated herein. FIG. 3d shows the execution of this operation which takes place in three steps under the control of the microprogram store ROM (FIG. 3a).

Loading cycle

The instruction is fetched from the store and is arranged on the one side in the register K, while on the other side the bits 8 to 15 of this instruction are placed in the register E. The contents of the register E are then increased by 2, and the result is dispatched to the registers S and P.

Cycle for placing the second operand in the register E

In accordance with the operation code of the instruction, the store ROM supplies the control commands necessary for placing the operand in the register E.

Execution cycle for the arithmetical operation

The contents of the register E and the contents of the register R1 of SPAD, specified by the current instruction, are added, the result of the operation being stored in the register R1. The condition register CR is also updated.

These three steps are performed in the central unit as follows:

a. Loading cycle

The address register S contains the storage address of the next instruction of the previous instruction. In reaction to a signal of a microcommand of the store ROM, the central unit 2 submits a bus request to the bus control device 10, which grants control over the bust thereto if no other master occupies the bus, and supplies a rhythm signal TMRN after having placed the contents of the register S on the address line MAD. When the store recognizes this address, it dispatches the contents of this storage word on the data lines BIO and validates these data by sending the signal TRMN to the central unit. The data originating from the store are written in the register K on the one side, while on the other side the multiplexer D, positioned in the short constant mode (see foregoing description, transfers the eight right-hand bits of these data (bits 8 to 15) to the register E. In the case of an instruction of the type T8, the second operand has already been placed in the register E and is ready for use. The loading cycle of the instruction is followed by the incrementation of the contents of the register P: the contents of P are transferred, by way of a microcommand SC1, to the input A of the unit ALU. A then receives the command to add a value 2 to the contents of P. This is effected by a command originating from the store ROM via the connection SC2. The result of this addition is then successively applied (always under the command of the store ROM) to the register S and, by way of the register L, to the register P. The register S then contains the address of the next storage word and the loading cycle of the instruction has been completed.

b. Cycle for placing the second operand in the register E

After the decoding of the instruction by the address generator GA and the selection of the new microprogram to be executed, the store ROM dispatches command signals to the various parts of the central unit. In the case of an instruction of the type T8 (the other types of instruction are not described since they are not necessary for a proper understanding of the invention), if the right-hand part of the instruction is transferred to the register E during the loading cycle, the operand (being a short constant of 8 bits, whereto zero is added in the register E for the bits 0 to 7) is already ready for use in register E. In the case of instructions of the type T1 to T7, this loading cycle would be necessary for placing the second operand in the register E.

c. Execution cycle for the arithmetical operation

Per definition of the instruction, the first operand is present in the register R1 of SPAD. Consequently, the register R1 has been selected and its contents are transferred to the unit ALU via the input A. The second operand is present in the register E; it is applied to the unit ALU via the input B. The unit ALU adds these two words and applies the result to the register R1 of SPAD, via the data register L.

2. The input/output instructions

These instructions are instrucions originating from the store and forming part of the program currently being executed in the central unit; they serve to request action from the peripheral units. The mode of use of the said bus for transferring, under the control of the program being executed in the central unit, the information to the peripheral units is referred to as programmed bus. For the explanation of the operation of the system for the execution of such instructions, they will be successively described.

A. - The different types of input/output instruction and their functions.
B. - The construction of a peripheral unit.
C. - The completion of a data exchange between the peripheral unit and the central unit.

A. The various types of input/output instructions

There are five of these instructions. Their respective mnemonics are: CIO, OTR, INR, SST and TST. CIO: this instruction may have two different functions:

the starting of an input/output operation of a peripheral unit (the bit F in that case equals 1; see described description hereinafter).

stopping a data transfer, or setting a peripheral unit to the inactive state (the bit F equals 0).

This instruction is an instruction of the type T8 (see foregoing description), having a format as follows:

| 0 | 1000 | R3 | 1 | F | DA | bit No. 0      4 5 7 8    9 10 15

In accordance with the value of the bit F, the operation is started or stopped. The field DS of the instruction, coded on the bits 10 to 15, represents the address of a peripheral unit.

The execution of this instruction is as follows: the central unit requests the use of the bus, and subsequently transmits the address DA of the peripheral unit via the address lines of the bus. When this peripheral unit has recognized itself, it performs the operation coded in the bits 4, 8 and 9 of the instruction. Generally, the bits 4, 8 and 9 of the current instruction set the triggers F0 and F1 (see hereinafter) after the decoding in the peripheral unit. These triggers F0 and F1 are controlled also by the peripheral unit to a given extent when the said unit cannot operate: it then impresses the non-operable condition (see following pages). OTR: This instruction is a register output instruction, which means that the contents of a register of SPAD are to be transferred from the central unit to the selected peripheral unit.

The format of this instruction is as follows:

```
| 0 | 1000 | R3 | 0 | F | DA | type T8
```

If this operation is accepted by the peripheral unit whose address is given in the field DA of the instruction, the contents of the register R3 are transferred to the buffer register of the peripheral unit. The bit F is then also transferred to the said peripheral unit in order to specify a given function for this unit; this function can vary according to the type of the peripheral unit: INR: the instruction has a function opposed to that of the previous instruction: The contents of the buffer register of the peripheral unit are transferred to the register R3 of SPAD.

The format of this instruction is as follows:

```
| 0 | 1001 | R3 | 0 | F | DA | type T8
```

The execution of this instruction implies the transfer of the contents of the buffer register of the peripheral unit to the register R3 of SPAD, after the said peripheral unit has recognized its address (bit F indicates a given function). SST: This instruction consists of the request to the peripheral unit to send the contents of its status word to the register R3 of SPAD, the said status word containing different information as regards the peripheral unit, notably information concerning the proper execution of the information transfer (bit F indicates a given function).

The format of this instruction is as follows:

```
| 0 | 1001 | R3 | 1 | 1 | DA | type T8
```

The status word of the peripheral unit may have a variable length in accordance with the type of peripheral unit. Given bits of this status word of the peripheral unit have a fixed position which is independent of the type of peripheral unit used. When the value of these bits equals 1, their significance, determined by their position, can be summarized in the following table:

| Bit number | Significance |
|---|---|
| 15 | The peripheral unit cannot operate |
| 14 | Transmission error |
| 13 | Data error |
| 12 | Incorrect length. |

TST: this instruction is executed to test the state of a peripheral unit so as to find out whether the said unit is ready to communicate. During the execution of this instruction, the status word of the peripheral unit is placed in the register R3 of SPAD; the presence of a 1 in the location of the sixteenth bit indicates that the said peripheral unit is occupied. The format of this instruction is as follows:

```
| 0 | 1001 | R3 | 1 | 0 | DA | type T8
```

As in all previous cases, DA indicates the address of the peripheral unit.

B. CONSTRUCTION OF A PERIPHERAL UNIT

FIG. 3b shows an embodiment of a peripheral unit. This peripheral unit is a printing device in which the control unit 50 is separated from the printing unit 51. The latter section (51) will not be described because it is well-known.

In FIG. 3b, the bus 1, comprising the data lines BIO, the address lines MAD and the control lines CONTROL, is connected to the control unit 50 of the peripheral unit as follows:

The lines BIO are connected to the buffer register BUF, the output of which is connected to a set of parallel AND-gates, only the gate 52 being shown.

The lines MAD are connected to the address decoding device ADDEC and to the command decoding device COMDEC.

The control lines CONTROL are connected on the one side to the address decoding device ADDEC, via the line which receives the signal TMPN and via the lines originating from ADDEC which return the signals TPMN and ARN, and on the other side to the output of the OR-gate 53 which returns the signal ACN. The outputs 54, 55 and 56 of the decoding device COMDEC are validated by the signals originating from the command acceptance generator GCD, i.e., via the lines 57, 58 and 59 and the gates 60, 61 and 62 which supply the control signals to the control store 70, the outputs 66, 67 and 68 of which are connected on the one side to the OR-gate 53 and on the other side, via the lines 63, 64 and 65, respectively, to the command acceptance device ACC. The said device ACC supplies control signals to the bistable triggers FHALT, FSTR and FWR via the lines 69, 71 and 72, respectively. The output of the trigger FWR validates the gate 52, while FSTR, controlled by ACC, starts the printing operation of the device 51. The position of the two bistable triggers F0 and F1 is controlled by the device 51 (for example, in the case "non-operable") and via the lines 80 and 81 which control the said triggers on the basis of the decoded command dispatched by the central unit via the lines MAD 0,4, 08 and 09. On the other hand (FIG. 3c), the changeover from the state EXT to the state ECH is controlled by the peripheral unit as soon as it has completed the execution of EXT. In accordance with the combination of the relevant values of their outputs, they indicate the feasible states of the peripheral unit:

| F0 | F1 | STATE OF THE PERIPHERAL UNIT |
|---|---|---|
| 0 | 0 | Inactive (INCT) |
| 1 | 1 | Exchange (ECG) |
| 0 | 1 | Execution (EXT) |
| 1 | 0 | In expectation of the transfer of a status word (WST) |

The significance of these different states will be described in the subsequent section C. The device ACC is also connected to the buffer register BUF via line 73. The device DAEX is either connected to the lines BIEC via the line 74 through the interruption line 75, or to the interruption request line 76. The device STAEX is connected, via the interruption line 75, to the interruption line BIEC. The operation of such a peripheral unit will be described in the next section which concerns, for example, a data exchange between the central unit and the peripheral unit (the peripheral unit chosen is a printing device, and it will be obvious that the data originate from the central unit and are applied to the peripheral unit. A peripheral unit such as a punched card reader will operate in the same manner by reversing the direction of the data).

Figure 3E:
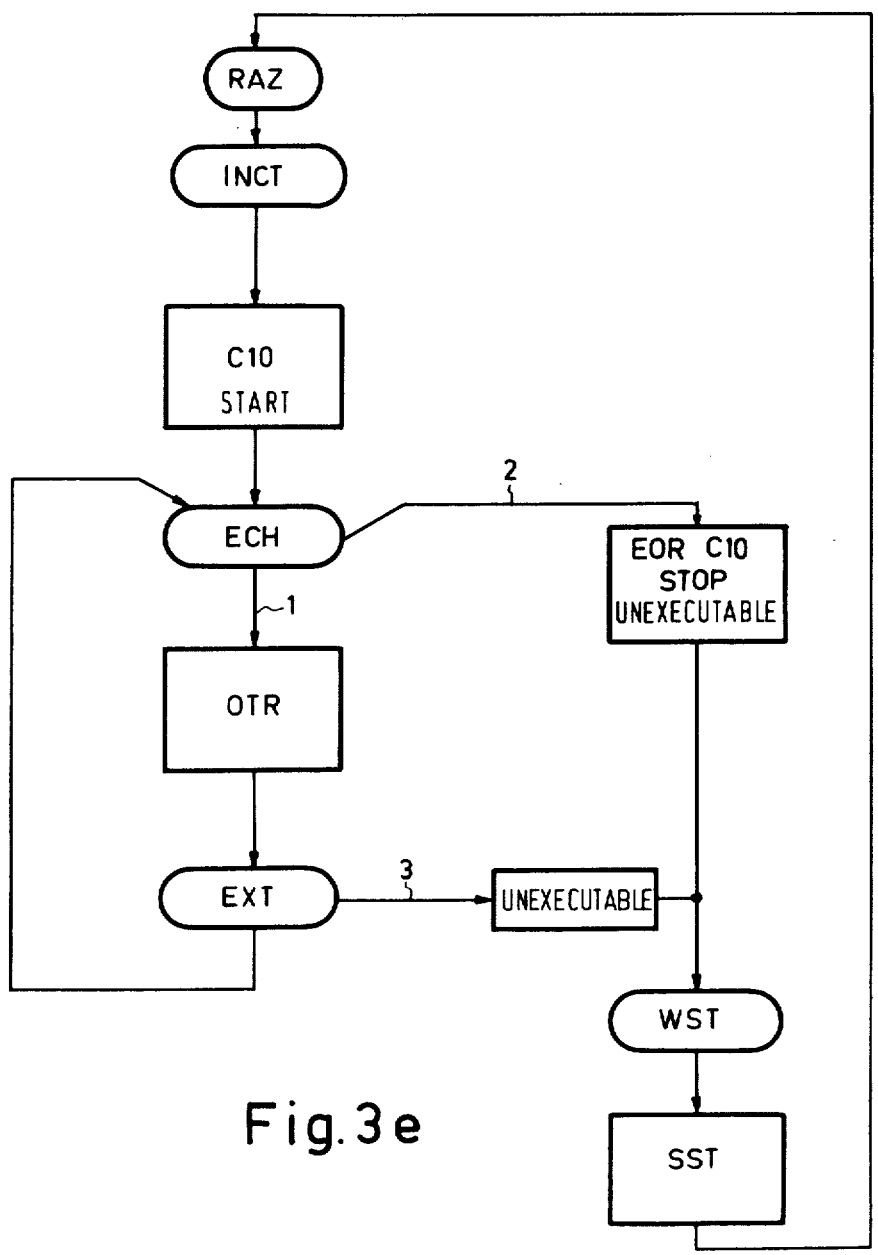

C - Execution of a data exchange between the central unit and the peripheral unit FIG. 3e shows the various steps of such a data exchange:

When the data processing system is started, a general instruction "reset to zero (RAZ)" is dispatched to all peripheral units, in order to set all registers and triggers of the said unit to the zero state. Norably the triggers F0 and F1 are set to zero, and the unit is in the inactive state INCT in which it cannot operate. Because in the present example the central unit requires this peripheral unit for printing a text, the central unit will render the said peripheral unit active by executing a starting instruction CIO (see section 1), for which the bit F equals 1. Therefore, the central unit, previously having made a bus request, dispatches the address of the peripheral unit via the lines MAD 10 to 15 and a command to be executed via the lines MAD 04, 08 and 09. The said central unit subsequently dispatches the rhythm signal TMPN. Upon reception of this signal TMPN, the address decoding device ADDEC returns the rhythm signal TPMN and the signal ARN to signal the central unit that the address of the peripheral unit has been recognized. The command detecting device COMDEC receives the various commands to be executed via the address lines MAD 04, 08 and 09.

These commands, stored by the device 70, are transferred to the command acceptance device ACC after validation by the device GCD. In the case of an operation CIO start, one of these commands notably consists of the changing over of the trigger FWR which dispatches a validation signal to the AND-gate 52; the command further consists of the validating, by means of a command originating from the device ACC via the line 73, of the contents BUF, originating from R3 via the lines BIO.

The signals ARN and ACN set the condition register CR of the central unit. The fact whether or not the command has been accepted can be established from the value of this register.

The peripheral unit is then in the waiting for exchange state BCH, and the triggers F0 and F1 have been set in accordance with the foregoing tables.

The remainder of the exchange generally consists of the execution of instruction OTR (for the example of a peripheral unit which performs a data output operation). This instruction, as already described, enables the central unit, which has taken control over the bus, to address the peripheral unit whose address is contained in the bits 10 to 15 of said instruction. The completion of this part of the exchange is effected in the same manner as already described.

At the same time, the command decoding device COMDEC decodes the commands applied via the lines MAD 04, 08 and 09. The acceptance of these commands is effected by returing the signal ACN, via the OR-gate 53, to the central unit. Like before, the trigger FWR has been set to validate the gate 52, with the result that the data arriving from BUF can pass; these are the data which are dispatches from register R3 by the central unit via the lines BIO. It is, of course, obvious that the gate 52 represents a system of gate 1 per bit of the register BUF. (The data in BUF have been validated by the command signal from ACC via the line 73). FIG. 3c illustrates the execution of the instructions CIO and OTR after the signals transferred via the bus between the central unit and the peripheral unit have been placed in succession. In this Figure, and in the subsequent Figures, the shaded parts indicate that the signal is not defined at this instant. The address lines MAD are validated briefly for the signal TMPN. They cease to be validated as of the instant of transmission of the signal TRMN. The signals ARN and ACN are subsequently dispatched to the central unit. The data on the lines BIO are considered as such when the signal TMPN rises again.

During the execution of the instruction OTR, the peripheral unit changes over to the execution state EXT, i.e., the state in which the trigger F0 and F1 are in the state given in the foregoing table. The end of the execution of this command normally causes the said peripheral unit to return to the exchange state ECH.

The return to this exchange state is followed by the dispatch of an interruption request signal which is generated by the unit DAEX. DAEX is the data exchange request unit which submits data exchange requests via the lines 74 and 75 (programmed bus). In the case where the peripheral unit is connected to an input/output processor (to be described hereinafter), the device DAEX dispatches an exchange request via the line 76.

The peripheral unit also has other possibilities of leaving the exchange state ECH. These possibilities are:

The peripheral unit cannot function (for example, because it is not connected to the electricity mains), the starting instruction CIO could not be executed; the peripheral unit is then in the non-operable state (branching 2 in FIG. 3e).

The peripheral unit is in the branching 1 of FIG. 3e (exchange state ECH), but the central unit wishes to terminate the exchange. The said central unit then executes an instruction CIO STOP (bit F = 0), as shown in the diagram of FIG. 3c (the bistable trigger FHALT is set).

The peripheral unit is connected to an input/output processor (to be described hereinafter), and the end of the transferred block has been detected (signal EOR).

One of the three described cases, or the case corresponding to the branching (3) of the previous organigram (instruction OTR which cannot be executed by the peripheral unit in the non-operable state) sets the peripheral unit to the waiting for exchange state for exchanging the status word WST with the central unit. To this end, the peripheral unit dispatches an interruption request, by means of the device STAEX, for requesting the exchange of a status word, which is decoded on the lines BIEC. If this request is accepted by the central unit, this unit executes an instruction SST. This instruction serves to transfer the contents of the status word of the peripheral unit to the register R3 of SPAD. This status word, as described above, contains a number of data. Notably, the value of the trigger FNOP (indicating that the peripheral unit was in the non-operable state) and that of the trigger FTHR (indicating a transmission error) are applied to the central unit via the data lines 15 and 14, respectively.

The exchange has then been completed, and the peripheral unit returns to the inactive state.

3. THE INSTRUCTIONS WER and RER

As already stated, the exchanges of data between the peripheral units and the store via the programmed bus are comparatively slow; they require a substantial amount of time if large quantities of data are to be transferred. Moreover, after the tranfer of each information, an uninterruption signal must be dispatched to the central unit and the operation of the central unit must be stopped (under given conditions, which are described in section III of the chapter Central Unit). Therefore, it is desirable, when the peripheral units are fast units and the quantity of data to be transferred is substantial, to create a high-speed transmission mode on the bus between the peripheral units and the store. This high-speed transmission is effected by way of word blocks, and the operations are controlled by the input/output processors according to a mode which is referred to as "multiplex". However, it will be obvious that such processors require given information to enable the control of the transfer of information between two units; this information concerns, for example, the length of the block to be transferred, the store address where the data are to be stored, etc.

This information is stored in the registers of the input/output processors, which are referred to as external registers.

These registers are loaded by the central unit. Consequently, for the addressing of the registers of the input/output processors use can be made of:
either storage addresses
or peripheral unit addresses
or new instructions.

If use is made of storage addresses, in which case the corresponding storage words cannot be used, the maximum addressing capacity of the store will not be reached. Therefore, this solution is not interesting, not even if use is made of peripheral unit addresses, because in that case the maximum addressing capacity of the peripheral unit will not be reached either.

Consequently, the solution to this addressing problem is the creation of new instructions, which serve to enable the exchange of information with the said external registers. The mnemonic instructions WER (writing in external register) and RER (reading in external register) have the following formats:

WER | 0 | 0 1 1 0 | R3 | ERA | type T8
bit no. 00   01    0405 0708   15

This instruction of the type T8, the operation code of which is represented by the bits 1 to 4, serves to dispatch the contents of the register R3 from SPAD to the external register ERA having the address coded in the bits 08 to 15. The execution of this instruction of the type T8 in the central unit is as already described.

RER | 0 | 1111 | R3 | ERA |

This instruction RER of the type T8 serves to realize the transfer of the contents of the external register having the address ERA to the register R3 of SPAD. This instruction is executed in the manner described above for the instructions of the type T8.

The use of these instructions will be described in the chapter dealing with the input/output processors. The input/output instruction and the instruction for reading/writing in the external register are instructions which are executed by the central unit to perform the information transfers between the central unit and the relevant peripheral units and the input/output processors. This type of transfer is effected in the "programmed bus" mode. The direct information transfers between the peripheral units and the store under the control of an input/output processor are word block transfers; this type of transfer is also referred to as "multiplex" mode. A peripheral unit can thus exchange the information in either the programmed mode (or programmed bus) or in the multiplex mode (or multiplex bus).

III. THE INTERRUPTION SYSTEM

An interruption system serves to allow the completion of the current program in the central unit of the computer to be interrupted under given conditions. these interruptions can be subdivided into internal interruptions and external interruptions. The internal interruptions will not be described herein, because these interruptions relate to conditions such as current interruptions etc.

It is sufficient to know that the priority level of such interruptions is very high, because in the case of a current interruption, only a very short period of time is available for saving the parameters in the store which are necessary for proper restarting of the program when the current interruption has been remedied. The external interruptions are interruptions which are requested by the peripheral units of the system and which are dispatched to the central unit via the lines BIEC (FIG. 3a).

In practice each peripheral unit comprises a coding device which, when the peripheral unit requests an interruption, dispatches a word of 6 bits via the six lines BIEC, the numerical value of the said word corresponding to the priority level of the said peripheral unit. If two or more peripheral units simultaneously request an interruption, the coding devices of each peripheral unit are adapted such that only the priority level of the peripheral unit having the highest priority is coded on the lines BIEC.

This 6-bit priority level is then transferred, via the lines BIEC, to the interruption unit INT of FIG. 3a. The contents of the priority level register PL, being the priority level of the current program, are then compared with the priority level of the peripheral unit requesting an interruption in the said unit INT. If the priority level of the current program is higher than that of the said peripheral unit, the program is completed in the normal manner. In the opposite case, the said program is interrupted; the parameters corresponding to this program are stored in the store, and the priority level of the peripheral unit is stored in the section PL of the status word PSW. These operations are controlled by the microprogram store ROM, which is started by the interruption signal IR. This signal IR is supplied by the unit INT if as a result of the comparison an interruption must take place. However, it should be emphasized that this interruption can take place only provided that the unit INT is granted approval, by way of the signal ENB, to interrupt the current program. It will be obvious that in the case of a current interruption, the interruption program which ensures the storage in the store of the parameters of the current program, may in no case be interrupted and in that case the signal ENB will not be given.

The new program to be completed by the system must be found in the store. To this end, its relevent starting address must be found in the store. This address is obtained as follows:

The new level of the program is generated on the lines INTAD. The contents of these lines are stored, via the unit ALU, in the register S, and are transferred to the register E by the multiplier D in the mode PL. The contents of this register are transferred to the register PL. The central unit then submits a bus request. After the addressing of the store and the exchange of the rhythm signals, the contents of the storage word are selected and transferred, via the lines BIO and the multiplexer D, to the register E. The data then present in register E represent the address of an interruption program which is to be performed after the request by the peripheral unit. This interruption program, the starting address of which is now known, will be performed in the described manner for an arbitrary program comprises an instruction for the return to the previous, interrupted program. The end of this interrupted program, thus enabling the restarting of this program (it should be noted that a current program can be interrupted, except in special cases, at the end of each instruction, regardless of the exchange cycle on the bus).

IV. INPUT/OUTPUT PROCESSOR

An input/output processor included in a system according to the invention, such as the processor 4 and the processor 5 in FIG. 1, serves to control the exchanges of data between the central store of the system and the peripheral units, independent of the central unit. The said central unit, however, initiates the said processor by supplying the processor with two control words, prior to each data exchange, the said control words informing the said processor as regards the length of the data block to be transferred and the corresponding addresses of the store.

The end of a data exchange controlled by such a processor is directly signalled to the central unit by the relevant peripheral unit by transmitting an interruption request. Between the initiating action and the interruption request, consequently, the central unit is completely free to complete the current program and to leave the work performed by the said processor out of consideration.

After having been initiated, this processor has the responsibility to demand the control over the bus as soon as it has detected an exchange request originating from a peripheral unit, and to send, via the lines MAD, the addresses of the peripheral unit (corresponding to the sub-bus whereto the said peripheral unit is connected) and of the associated storage word.

In order to enable the described tasks to be performed, the input/output processor can operate according to three different modes:

Mode "Central unit": the input/output processor reads and writes the control words (two per peripheral unit) which it receives from the central unit via the data lines BIO. The said central unit is the master of the exchange on the bus, the input/output processor being the slave.

Mode "Exchange": the input/output processor has submitted a bus request which has been granted. The said processor initiates the data exchange between the peripheral unit concerned and the store; these are both slave units.

Mode "Sampling": the state of the input/output processor is sampled to determine whether one of the peripheral units connected to the said processor via the exchange request lines has submitted a request (change-over to the mode "Exchange"), or whether the central unit supplies a command (change-over to the mode "Central unit").

The detailed description of these different modes of operation of an input/output processor will be given after the description of the structure of the said processor.

1. Structure of an input/output processor

Figure 4A:
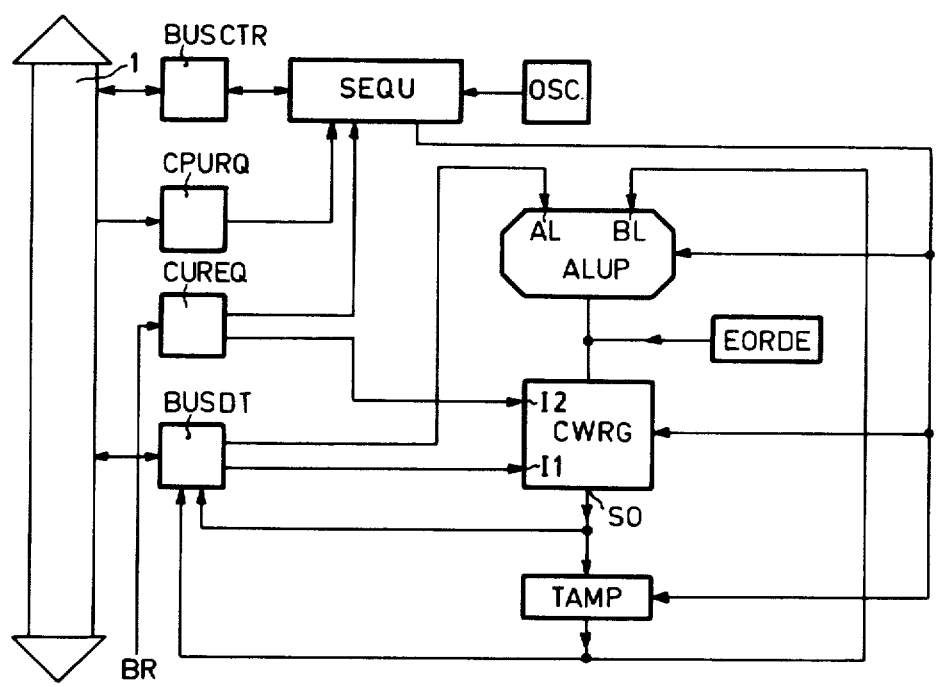
FIGS. 4a and 4b show an input/output processor and a diagram of the signals exchanged by the various units, under the control of an input/output processor, during a data transfer between the store and a peripheral unit.
Figure 4B:
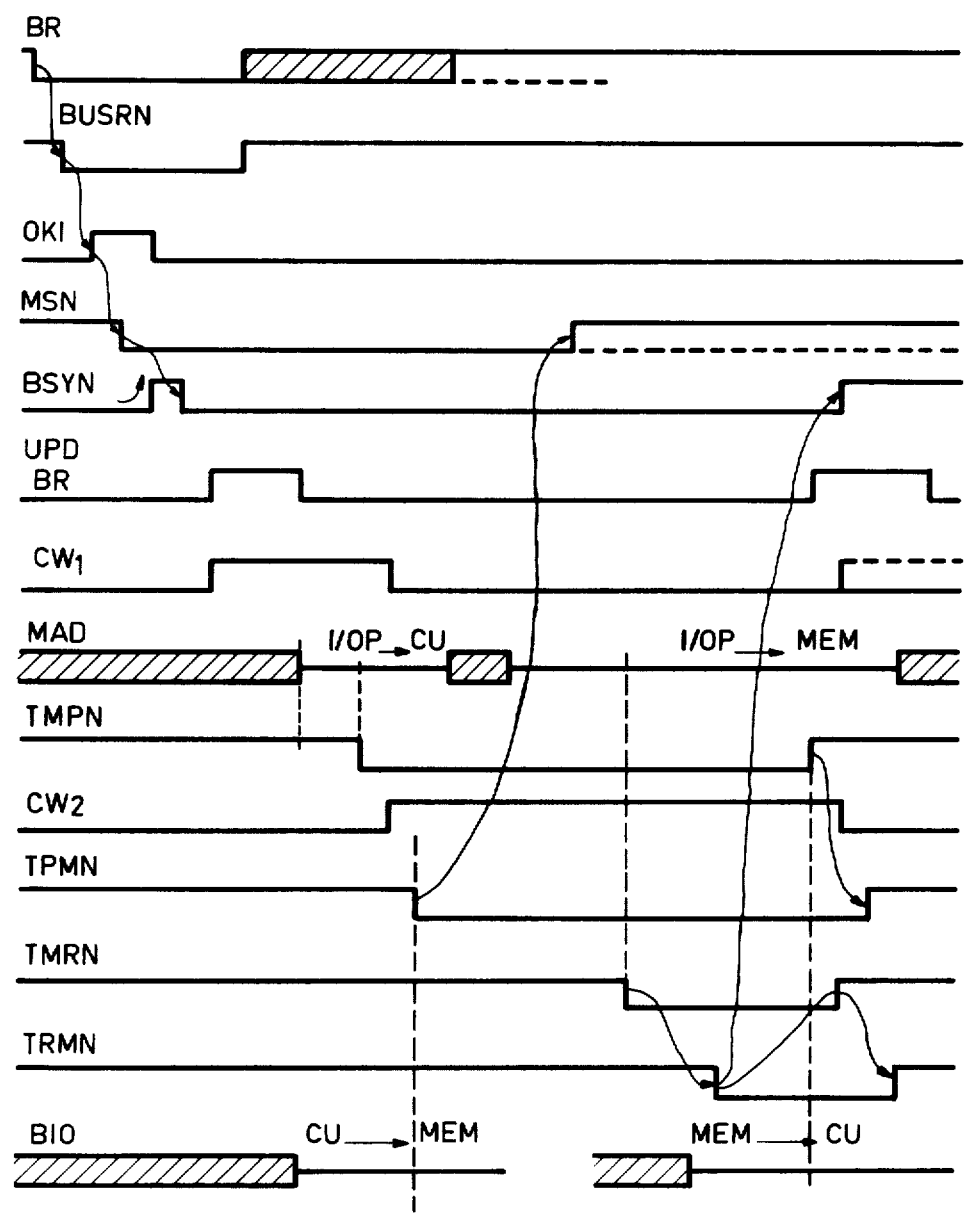

The structure of an input/output processor is shown in FIG. 4a. The sequence circuit SEQU is controlled by the oscillator OSC and receives the command signals originating from the bus control unit BUSCTR. This unit BUSCTR is connected to the bus 1. Circuit SEQU furthermore receives command signals from the request detection device of the central unit CPURQ, which itself is connected to the bus 1, and from the exchange request detection device CUREQ of the peripheral units, while the said sequence circuit SEQU itself applies command signals to the arithmetic and logic unit ALUP, to the set of control word registers CWRG, and to the buffer register TAMP. The calculation loop of the input/output processor is formed by the arithmetic and logic unit ALUP, which is connected to the set of control word registers CWRG, the output of said registers being connected to the buffer register TAMP which applies a signal to the input BL of the unit ALUP. Between the unit ALUP and the registers CWRG there is provided the block and detection device EORDE, while the output SO of the unit CWRG is also connected to the device BUSDT. The said device BUSDT also receives the signals originating from the register TAMP, and applies the data signals originating from the bus 1 to the output AL of the unit ALU or to the input I1 of CWRG which also receives, on 12, the exchange request signals transferred by the peripheral unit via CUREQ.

These various units have the following functions:

SET OF CONTROL WORD REGISTERS CWRG

There are two control word registers, referred to previously as "external registers" per peripheral unit. They contain the information concerning the information transfer to be performed between the corresponding peripheral unit and the store under the control of the input/output processor.

Unit ALUP

This is an arithmetic and logic unit comprising two inputs AL and BL which enables the various registers of CWRG to be permanently updated.

Register TAMP

This is an input register of the arithmetic unit ALUP, i.e. via the path BL, when it is necessary to update a control word.

Sequence circuit SEQU

This is the clock signal generator which synchronizes the operation of the various units of the system, i.e. it applies command signals to the said units at the correct instant.

This sequence circuit is controlled by the oscillator OSC and is conditioned by the signals supplied by CPURQ and CUREQ.

Bus control unit BUSCTR

This unit receives and transmits the control signals and the signals relating to the dialogue via the bus.

Data unit BUSDT

This unit receives and transmits the data via the bus 1. Notably the control words originating from the central unit are passed through this unit in the direction of the register of the CWRG. However, the contents of these external registers can be transferred to the central unit via BUSDT.

Unit CPURQ

This unit detects the requests originating from the central unit when the latter wishes to contact the input/output processor. To this end, the unit CPURQ detects the presence of the address of the input/output processor on the lines MAD 10 to 15.

Unit CUREQ

This unit detects the exchange requests (signals BR) originating from the peripheral units. In the Figure only one line BR is shown. In fact, there are as many lines Br as there are peripheral units, i.e., 8 in the example described hereinafter. This unit selects the control words corresponding to this peripheral unit, by way of the input 12 of CWRG.

Unit EORDRE

This unit detects the end of a data block to be transferred, i.e., the detection of the value of an indicator which indicates that the next transfer is the last one (testing the line MAD 03).

2°. The various modes of operation of an input/output processor.

A. MODE "CENTRAL UNIT"

In this mode of operation, the central unit can execute the described instructions WER and RER. The address portion ERA defined above is composed as follows:

```
ERA  | PAD | SCAD | 0/1 |
       09 11 12   14 15
```

The portion PAD coded in the bits 09 to 11 indicates the number of the input/output processor under consideration. In this example, there are $2^3 = 8$ input/output processors which can be addressed by the central unit. On the other hand, the portion SCAD which is cooled in the bits 12 to 15 indicates the number of the sub-bus via which the peripheral unit is connected to the input/output processor under consideration, which in fact means the appropriate control words of the set of registers CWRG.

The bit 15 indicates, if it is a 0, the first control word CWI of the peripheral unit under consideration; when it is a 1, it indicates the second control word CW2.

The execution of an instruction WER or RER by the central unit means that via the lines MAD of the bus the 16 bits of the said instructions are transmitted (and also that the signal TMEN is transmitted), only the bit 04 (which indicates, by way of its value, whether it is an input instruction RER or an output instruction WER) and the address bits 09 to 15 being taken into account.

In the case of an instruction WER, the contents of the register R3 are transferred in the first control word CWI in the registers CWRG of the addressed peripheral unit.

The contents of this word CWI are as follows:

```
CWI  | M/C | E/S | A1 | A2 | Length of the block |
       00   01    02   03   04                  15
```

The bit "00" indicates the transfer mode, per word (M) or per character (c).

The bit "01" indicates the direction of the transfer:
0: transfer from the peripheral unit to the store (input instruction).
1: transfer from the store to the peripheral unit (output instruction).

The bits 02 and 03 constitute a portion of the storage address which is involved in the exchange. These two bits in fact define a storage block of 32 k words among four possible blocks, The bits 04 to 15 define the length of the block to be transferred.

The contents of the second control word CW2 indicate the effective address of the storage word involved in the first transfer.

```
CW2  | Effective address | R/L |
       00                  15
```

The bit 15 indicates the left-hand or the right-hand portion of the storage word when operation per character takes place.

An instruction RER is notably important to find out the residual length of the block to the transferred at the end of the transfer.

For this purpose, it is sufficient to execute an instruction RER CWI. The address of the peripheral unit (number of the processor plus number of the sub-bus) is dispatched by the central unit via the lines MAD, the central unit being the master of the bus and the line MAD 04 indicating an input instruction (bit 04 = 1).

Similarly, an instruction RER CW2 produces the address of the storage word involved in the next transfer.

In this exchange mode, the central unit is the master, while input/output processor is the slave. The said processor is addressed by the central unit via the lines MAD, the said central unit dispatching a validation signal for these addresses TMEM, the input/output processor responding thereto by sending a signal TRMN. During these signals the data are tansferred via the lines BIO.

The execution of the various operations in the input/output processor is as follows:

When the processor has recognized its address on the lines MAD 09 to 11, the relevant register of CRWG is addressed by means of BUSDT which transfers the address bits 12 to 14 on 11. The arithmetic and logic unit ALUP is then set by the sequence circuit SEQU so as to make it possible for the central unit to transfer the control word to CWRG via the lines BIO. The writing sequence in the corresponding registers of CWRG is given by the sequence circuit when the latter has detected a 0 on the address line MAD 04.

In the case of an instruction RER (MAD 04 = 1), the contents of the addressed register CWRG, are dispatched to the register R3 of SPAD via the lines BIO.

B. SAMPLING MODE

In this mode of operation, the input/output processor simultaneously scans the eight interruption request lines originating from the peripheral units. The detection of this interruption request on the lines BR (one of these lines is shown in FIG. 4a) is effected by the device CUREQ which corresponds to the devices 16 to 17 of FIG. 1 and which dispatches a command for bus request BUSRN to the sequence circuit SEQU; this command is executed by the device BUSCTR. The input-/output processor can change over to the exchange mode only after it has occupied the bus.

C. EXCHANGE MODE

The input/output processor is the master of the system and organizes a data exchange between the store and a peripheral unit which has made a relevant request. The first operation performed by the said processor consists of the application of the address of the peripheral unit which has made a request via the address lines MAD. In this case the processor knows its own address PAD which is applied via the lines MAD 10 to 12, while the sub-bus whereto the peripheral unit is connected is indicated by the device CUREQ which corresponds to the address of the word CWI of this peripheral unit in the set of registers CWRG. The number of the sub-bus is transmitted via the lines MAD 13 to 15. The various commands are applied at this input via the lines MAD; the line MAD 04 notably transfers the contents of the bit 00 of the word CWI from the relevant peripheral unit, while the lines MAD 08 and 09 are reset to zero (positioning after the decoding of the triggers F0 and F1 in the peripheral unit, see above). At the end of the exchange (last word to be received or transmitted) is indicated by the line MAD 03. The contents of the address lines thus applied to the peripheral unit are validated by the negative-going edge of the rhythm signal TMPN which is applied to the peripheral unit (see FIG. 4b). It is to be noted that at this instant the peripheral unit, which was first in the exchange state ECH, changes over to the execution state EXT. During the execution of this cycle on the bus and waiting for the end of the cycle which will be signalled by the reply signal TPMN of the peripheral unit, the contents of the word CWI of CWRG are applied, via the input BL, to the unit ALUP via the register TAMP, the said unit ALUP reducing the length of the block to be transferred by one, the result being returned to CWI while the unit EORDE performs a last transfer.

In the case of a data transfer to the store, the peripheral unit applies its data to the lines BIO and applies the signal TPMN to the input/output processor. A new exchange request (signal BR) is applied to the input/output processor for the next exchange. The input/output processor immediately starts the cycle corresponding to the second control word CW2 of the peripheral unit. This second word indicates the storage address of the transfer. The input/output processor thus addresses the store by sending the corresponding address via the lines MAD, the address of the peripheral unit then being suppressable on the said lines MAD after the reception of the signal TPMN by the input/output processor.

The input/output processor then applies the rhythm signal TMRN to the store which returns the signal TRMN to the processor when it has recognized the address of a word.

In the case of a write operation to the store, the data present on the lines BIO remain on these lines as soon as the peripheral unit has recognized itself, so that these data can be taken up by the store as soon as this store has determined the address at which these data are to be stored. However, in the case of reading in the store, the data can be applied via the lines BIO only after the storage address has been determined. The rhythm signal TMPN will validate these data at the insant at which it will become inactive again (in reaction to its positive-going edge).

The signal MSN, indicating that a master has been selected, is released by the processor as soon as the processor has received the signal TPMN.

Figure 6:
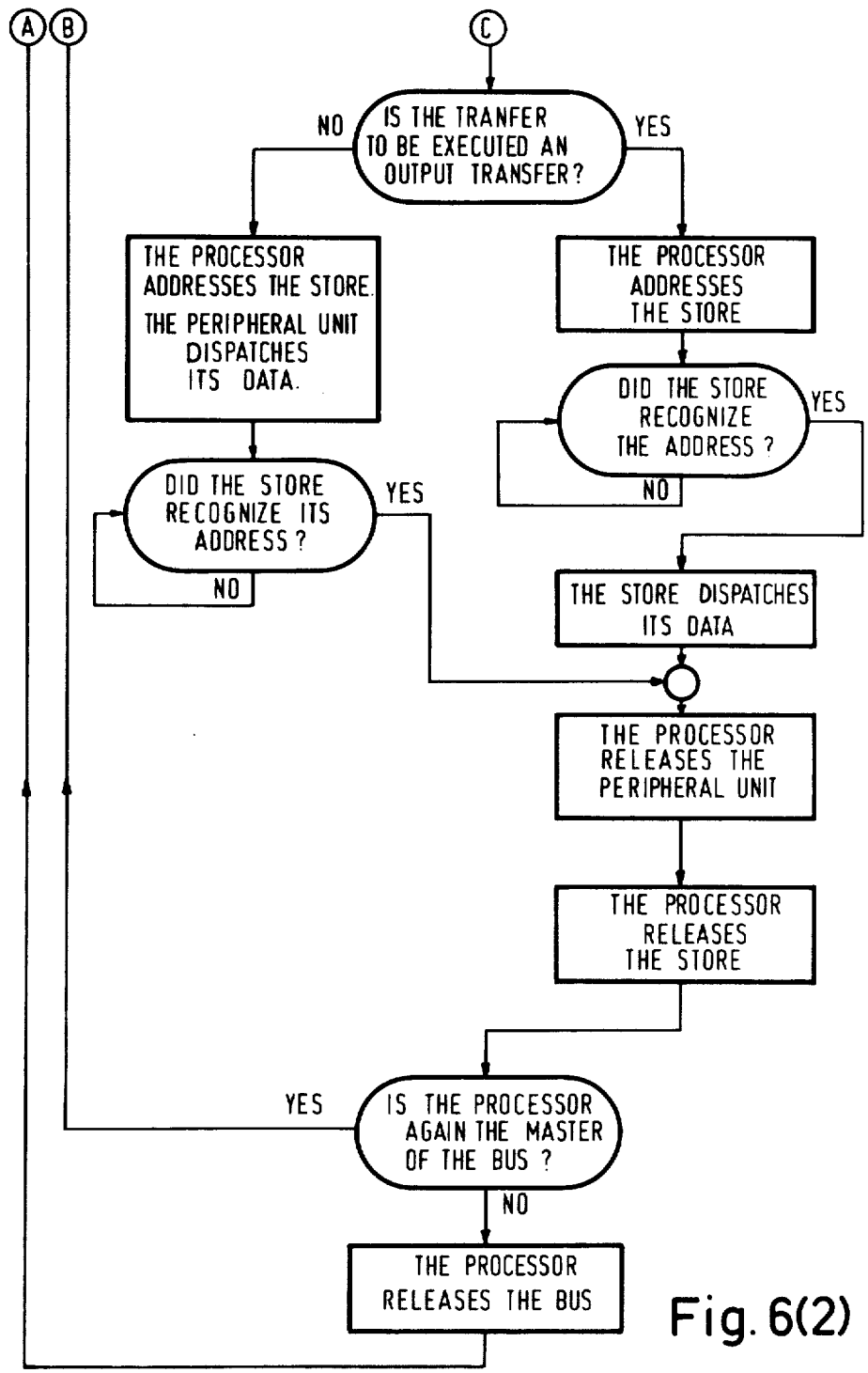
FIGS. 6(1) and 6(2) taken together show an organigram which illustrates a data exchange the store and a peripheral unit, the said exchange being controlled by the input/output processor.

The execution of these various operations will be better understood on the basis of FIG. 4b, which illustrates the succession of the signals on the bus, and on the basis of FIG. 6 which shows the various stages in the exchange of data between the store and the peripheral unit. This exchange is controlled by the input/output processor. FIG. 4b shows that the signals UPDBR, CW1 and CW2 are internal signals of the input/output processor. The significance of these signals is as follows:

UPDBR: Signal for updating the interruption requests possibly arriving from different peripheral units, in order to select the peripheral unit (in CUREQ) which has the sub-bus having the highest priority number of all units submitting a request for an exchange.

CWI: Selection signal for the control word CWI; this signal serves to update the length of the block to be transferred and for sending the address of the peripheral unit.

CW2: Selection signal for the storage address which is involved in the transfer and for updating the current address, i.e., the address of the storage word next to be selected.

According to this FIG. 4b, the exchange request signal BR becomes low as soon as the peripheral unit has submitted such a request to the input/output processor. The processor then dispatches the signal BUSRN on the bus (BUSRN becomes low). The bus control device sends the signal OKI which, as soon as it arrives in the said processor (assuming that no other master having a higher priority has submitted a bus request) causes the transmission of the signal MSN by this processor on the bus, this signal signalling the other masters that the processor has been selected as the master of the next exchange. When the signal BSYN becomes high again (signal released by the master of the previous exchange), the processor takes over the control of the bus by making the said signal low (for more details, see FIG. 5b). The processor periodically updates the priorities of the requests of the peripheral units whereto it is connected. This is illustrated in the Figure by the signal UPDBR which enables the selection of the peripheral unit having the highest priority at the instant at which the bus is connected to the input/output processor. During the cycle CW1, the processor addresses the peripheral unit (I/OP → CU) and applies the rhythm signal TMPN to the said peripheral unit. During the cycle CW2, the peripheral unit replies that it has recognized its address (the signal TPMN becomes low) and in the case of a data transfer from the peripheral unit to the store (on lines BIO in FIG. 4b, CU → Mem), the data are available on the lines BIO as of this instant. The processor subsequently addresses the store (via the lines MAD, section I/OP → Mem in FIG. 4b) and applies the rhythm signal TMRN so as to validate the storage address. The store, as soon as it has recognized itself, returns the signal TRMN which validates the data in the case of a transfer from the peripheral unit to the store. In the case of a transfer from the store to the peripheral unit, the data are transmitted by the store, via the lines BIO, a few moments before the dispatch of the signal TRMN; the fact that the signal TMPN becomes high (when TRMN is received) serves to validate the said data in the peripheral unit. The signal MSN returns to the high level (so as to select the master of the next exchange) as from the reception of TPMN. The rising to the high level of the other signals is indicated in the Figure by the arrows showing the linking of the said signals. For a better understanding of this exchange diagram, see FIGS. 5a to 5i which will be described hereinafter.

Figure 7:
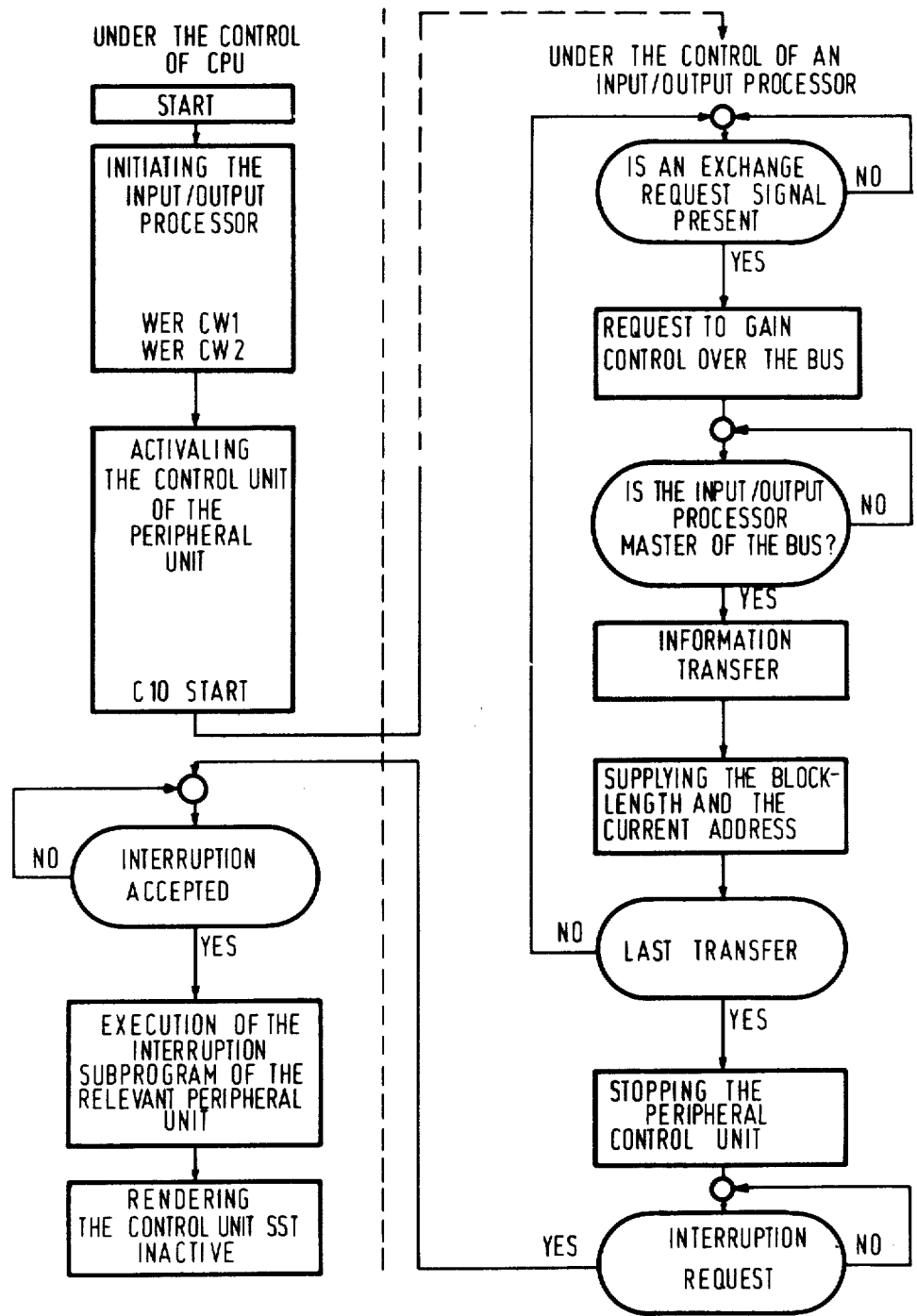
FIG. 7 shows an organigram which illustrates the initiating of the peripheral unit by the central unit, the data exchange between the store and the peripheral unit under the control of the input/output processors, and the interruption request of the peripheral unit which returns the control of the system to the central unit when the data block has been transferred between the store and the peripheral unit.

The various parts of an exchange between peripheral unit and store, i.e., the initiating of the exchange by the central unit, the execution of the exchange controlled by the input/output processor, and ultimately the end of the exchange by an interruption request for the central unit, are summarized in FIG. 7. The exchange part which is controlled by the central unit is situated at the left and is separated by broken lines from the exchange part controlled by the input/output processor which is situated at the right.

The input/output processor which is denoted by means of blocks in FIG. 4a will be described in detail hereinafter with reference to the FIGS. 5a to 5i.

Figure 5E:
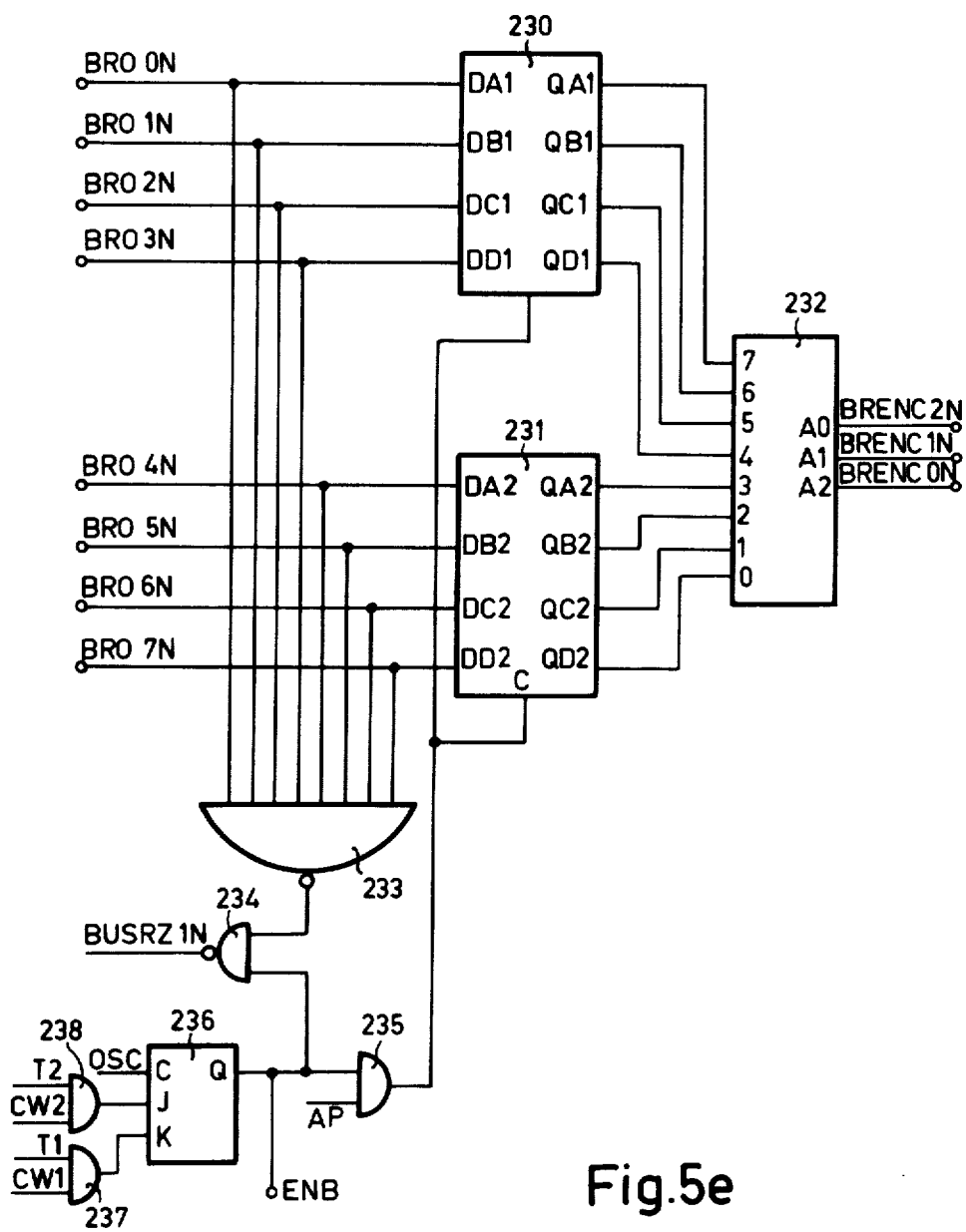
Figure 5F:
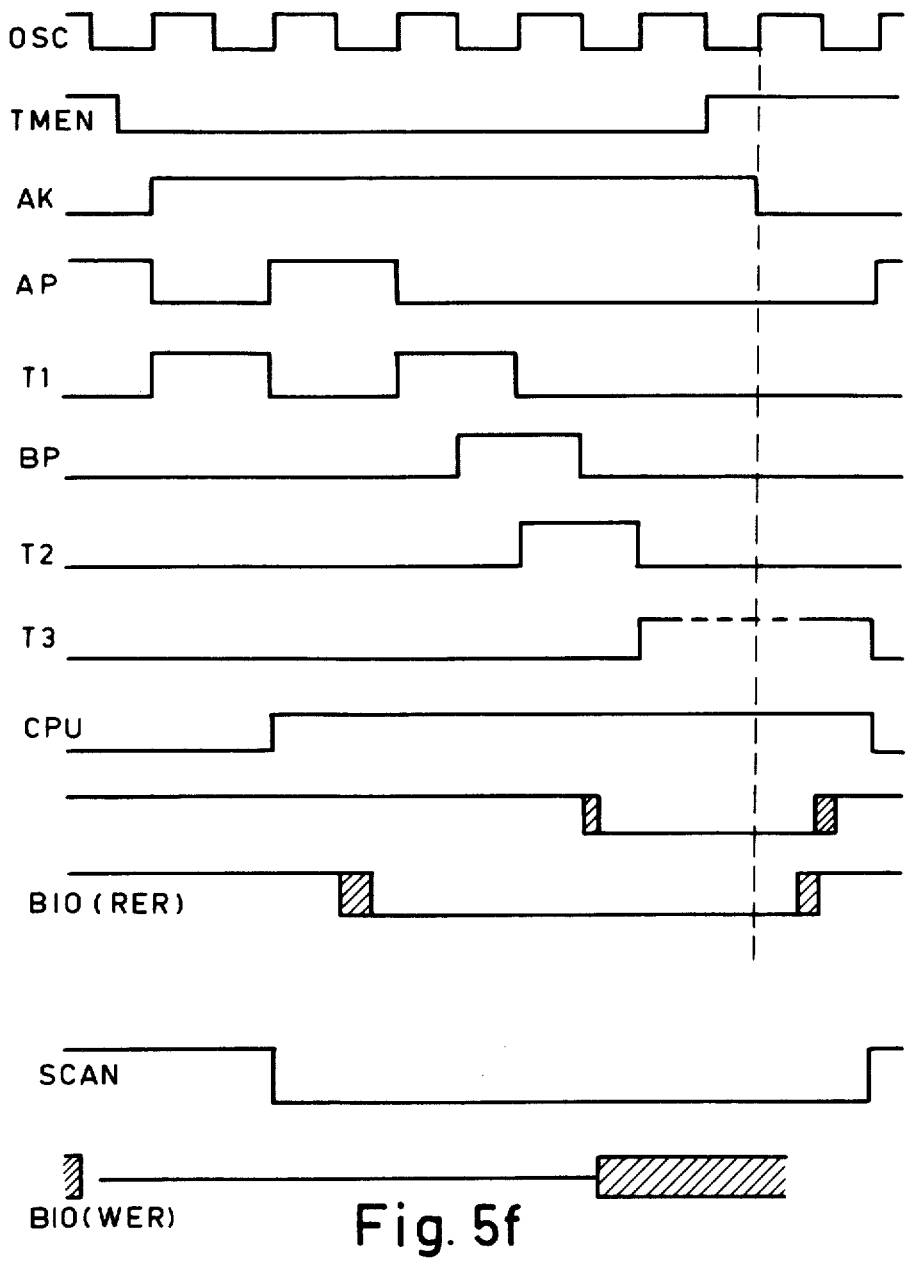
Figure 5G:
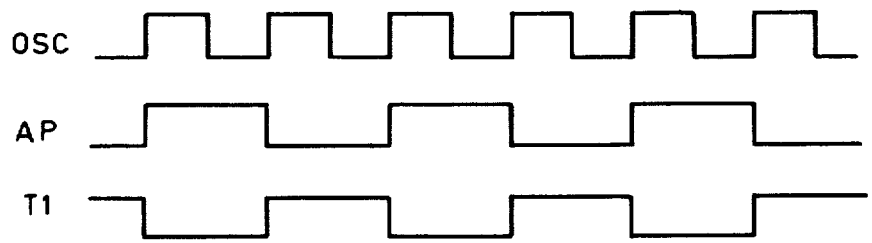
Figure 5H:
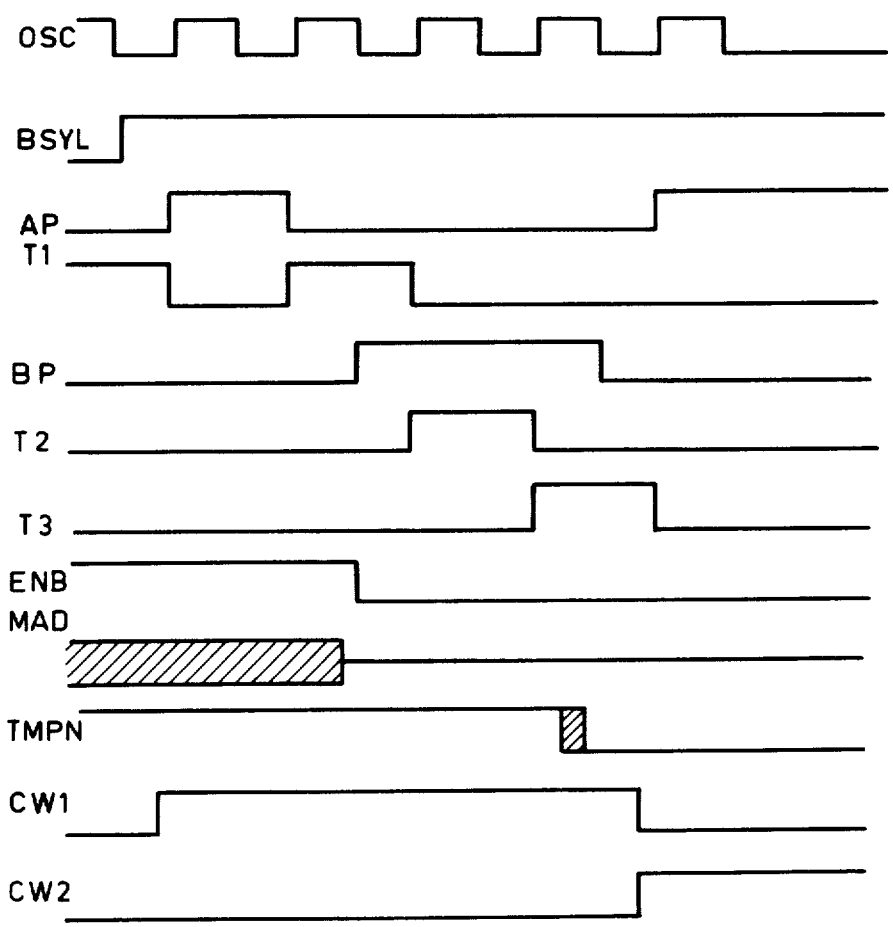
Figure 5I:
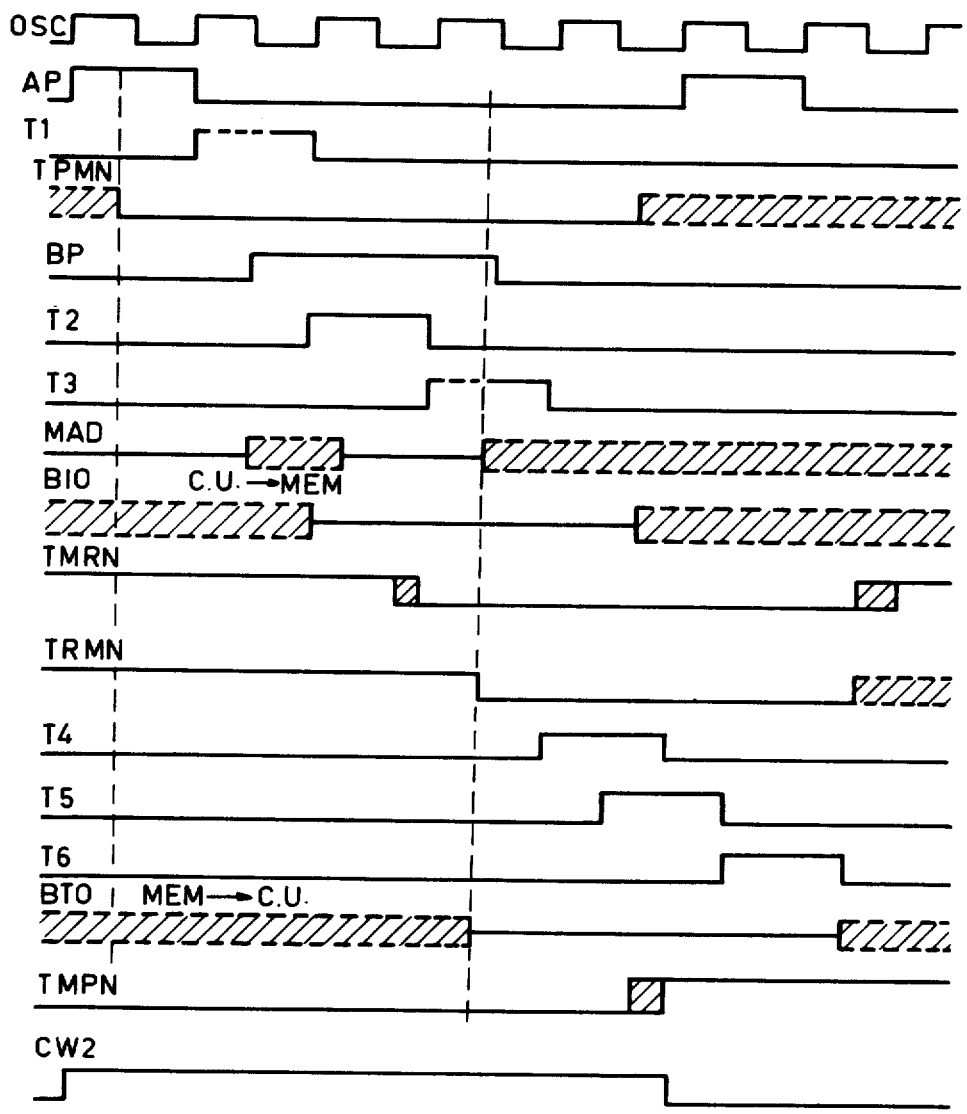

FIG. 5a shows the clock signal generator of the sequence circuit SEQU;

FIG. 5b shows the mode selection circuit of the sequence circuit SEQU;

FIG. 5c shows the detailed diagram of CPURQ;

FIG. 5d shows the detailed diagram of BUSCTR;

FIG. 5e shows the detailed diagram of CUREQ;

FIG. 5f shows the signals supplied by the various units in the mode "central unit";

FIG. 5g shows the signals supplied by the various units in the mode "sampling";

FIG. 5h shows the signals supplied by the various units in the mode exchange during the processing of the word CW1;

FIG. 5i shows the signals supplied by the various units in the mode exchange during the processing of the word CW2.

In accordance with FIG. 5a, the NOR-gate 151 receives the signals originating from the AND-gates 152, 153, 154 and 155.

On the one side, the AND-gate 152 receives the signal SCANN, inverted by the inverter 175, and on the other side the signal T1 which originates from the output Q of the trigger 159. The AND-gate 153 receives the signals AKN (generally, each signal whose last letter is an N represents a signal whose active value corresponds to the logical level 0), CPU and T3.

The AND-gate 154 receives the signals T3 and CW1, while the AND-gate 155 receives the signals T4 and CW2. (These different signals originate from devices which will be described hereinafter).

The output of the NOR-gate 151 is connected to the input of the trigger 156, the clock input C of which is connected to the oscillator OSC, its output $\overline{Q}$ supplying the signal AP.

The output Q of the said trigger 156 is connected to the NAND-gate 157, the second input of which received the signal originating from the NAND-gate 158. The said gate 158 itself receives the signals T1 and SCANN.

The output of the NAND-gate 157 is connected to the input D of the trigger 159, the clock input C of which is connected to the oscillator OSC, its output Q supplying the signal T1.

The said signal TI is also applied to the NAND-gate 160, the other side of which receives the signals SCANN and the signal originating from the NAND-gate 161. The output of the said gate 160 is connected to the validation input 170 of the section 178 of the multiplexer 162. The second validation input 177 of the section 179 of the said multiplexer is constantly conditioned by a logic signal 0.

A first input of the gate 161 receives the signal CW2, while the second input of the said gate receives the signal originating from the NAND-gate 246.

The output Q of the trigger 170 is connected to a first input of NAND-gate 246, the second input of which receives the signal TMPENB originating from the output of the trigger 244. The output Q of the trigger 167 is also connected to a first input of the AND-gate 243, the second input of which receives the signal TMPX which originates from the output Q of the trigger 242. The said trigger 242 receives the signal OSC on its clock input C, and the signal originating from the AND-gate 241 on its input D. The said AND-gate 241 comprises a first input which is connected to the output $\overline{Q}$ of the said trigger 242. The second input of the said AND-gate 241 is connected to the output to the NAND-gate 240 which receives the signals T2 and CW1. The signal TNPX originating from the output Q of the trigger 242 is applied to a first input of the gate 245, the second input of which receives the signal TMPENB originating from the output Q of the trigger 244. The NAND gate 245 supplies the signal TMPN. The input D of the said trigger 170 receives the signal TRMN which has been inverted by the inverter 169, while the clock input of the said trigger 170 receives the signal QUARTZ (the said signal QUARTZ is a clock signal having a frequency which amounts to twice the signal frequency OSC and which is in phase with the said signal OSC). The multiplexer 162 comprises two groups of inputs 178 and 179 which receives the signals 1, 1 and the signal originating from the output Q of the trigger 176 for the group 178, and the signals T2, T3 and T3 for the group 179. These inputs are selected two by two (one in each group) in accordance with the values of the signals CW1 and CPU which are applied to the address inputs of the said multiplexer 162.

This multiplexer, being, for example, of the type 74153, serves to select 8 input signals two by two by means of two address signals. In FIG. 5a, only six inputs are used and selected two by two (one address combination is not used, see below table). The first output of the said multiplexer 162 is connected to the input J of the trigger (of the type JK) 163, while the second output of said multiplexer 162 is connected to the input K of the said trigger 163. The clock input of the trigger 163 receives the signal OSC, while the output Q of the said trigger supplies the signal BP. The said output Q is also connected to the input D of the trigger 164, the input C of which receives the signal OSC and the output Q of which supplies the signal T2. The output $\overline{Q}$ of the said trigger 163 is connected to the input R of the trigger 159.

The output $\overline{Q}$ of the said trigger 164 is connected to a first input of the NAND-gate 165, the second input of which receives the signal originating from the output $\overline{Q}$ of the trigger 166.

The output of the said NAND-gate 165 is connected to the input D of the trigger 167, the input C of which receives the signal OSC, and the output Q of which supplies the signal T3.

This signal T3 is applied to the NAND-gate 171, which on the other side receives the signal originating from the output Q of the trigger 170 and the signal CW2.

The output of the said NAND-gate 171 is connected to the input D of the trigger 172, the input C of which receives the signal OSC and the output Q̄ of which supplies the signal T4.

The output Q̄ of the trigger 172 is connected to the input D of the trigger 173, the clock input C of which receives the signal OSC and the input Q of which supplies the signal T5. The said signal T5 is also applied to the input D of the trigger 174, the clock input C of which receives the signal OSC N, and the output Q of which supplies the signal T6.

The trigger R167 receives, via the inverter 168, the signal TPMN on its input D and the signal OSCN on its clock input C.

The described sequence circuit is the principal control unit of the input/output processor. This sequence circuit successively generates clock impulses, mainly the pulses AP and BP:

AP determines the starting of the operating cycle by positioning the triggers which control the cycle.

BP controls the arithmetic loop which contains the working registers and the arithmetic unit ALU. This sequence circuit is in fact formed by a series of triggers which are connected in the form of a shift register: the shifts are controlled by the clock pulses which originate from a controlled oscillator (not shown in the Figure) which supplies the signals OSC and QUARTZ (the signal QUARTZ has a frequency which amounts to twice the value of that of the signal OSC).

This shift register comprises a plurality of loops, the propagation within each loop being determined by the dialogue signals between the various units on the bus, and ensures that the resynchzonization on the output of the waiting loops corresponds to the dialogue. All stages of the sequence circuit are set to zero again when the asynchronous inputs receive a voltage (R or S), except for the trigger 156 which is set to 1 to allow admission of shift information.

1. FUNCTIONS OF THE SEQUENCE CIRCUIT

The trigger which initiates the cycle is the trigger 156 which supplies the signal AP. The pulse AP acts on the triggers which control the cycle and which determine the type of cycle to be performed in accordance with the existing execution conditions:

Cycle CPA (central unit cycle)
Cycle CWI (exchange cycle)
Cycle CW2 (exchange cycle)
Cycle SCANN (sampling cycle).

The trigger 156 should be conditioned such that the previous cycle can be terminated, without reverting to an already executed operation. Only the cycle SCANN, i.e., the sampling cycle, can be infinitely repeated, until the conditions of input/output processor change.

The trigger 156 is positioned by the output signal of the OR-gate 151 which, in conjunction with the AND-gates 151, 153, 154 and 155, constitutes a circuit of the type AND or NOT. The AND-gate 152 corresponds to the cycle SCANN, and the AND-gate 153 corresponds to the cycle CPU, the AND-gate 154 corresponding to the cycle CW1 and the AND-gate 155 corresponding to the cycle CW2.

The said AND-gates supply signals which have the logic value 1 if the conditions stated in the below tables are satisfied.

| Previous cycle | State of sequence circuit | Special conditions |
|---|---|---|
| SCAN | T1 | |
| CW1 | T3 | |
| CW2 | T4 | |
| CPU | T3 | AKN |

The meaning of this table is as follows: in accordance with the previous cycle (left column-signals high) and the state of the sequence circuit (central column) and in the last case when the signal AKN is high (inactive), a high or a low logic signal will be applied to the input D of the trigger 156.

As can be seen from this table, an additional condition AKN exists in the case of a cycle CPU. This condition, as will be described hereinafter, allows a second branching to be avoided in a cycle controlled by the trigger CPU in the case where the signal TMEN is delayed.

If one of these four conditions is satisfied (that is to say, the signals whose names are given on the same line of the below tables have the value 1), the output Q of the trigger 156 is set to 1 upon the positive-going edge of the oscillator OSC.

The output Q of the said trigger 156 is returned to zero, if the conditions for setting to 1 given in the above tables are no longer satisfied, by the next positive-going edge of the oscillator OSC.

The output Q of the trigger 159 is set to 1 in reaction to the positive-going edge of the oscillator OSC in the following two cases:

if the trigger 156 previously supplied a 1-signal (this corresponds to the shift sequence of the shift register)

if the trigger 163 does not supply a logic signal 1 on its output Q.

This is because in this case the trigger 159 is again positioned to zero via the input R. The latter case corresponds to the waiting loop of the signal TPMN during the cycle CW2, as will be described hereinafter.

The trigger 163 is set to 1 or 0 by the negative-going edges of the oscillator OSC, and is thus shifted over one half period with respect to the other triggers.

The multiplexer 162 serves to generate the signals which set the input J of the trigger 163 to 1 and the input K of the trigger 163 to 1. The multiplexer 162 comprises two portions 178 and 179, having three inputs which are 1, 1, and the output Q of the trigger 167, and T2, T3 and T3. The signals CW1 and CPU are applied to the address inputs of the multiplexer 162.

In accordance with the value of these signals, one of the said three inputs of each group 178 and 179 is selected, one of the logic combinations CW1 and CPU, i.e., the combination 1, 1, not being used (see below table).

On the other hand, the two condition inputs of this multiplexer, i.e., the input 176 and the input 177, condition the validation of the selected input signals. The truth table given below clarifies the formation of the signals applied to the inputs J and K of the trigger 163.

| BPJ | BPK | CW1 | CPU |
|---|---|---|---|
| TRMNRA | T3 | 0 | 0 |
| 1 | T3 | 1 | 0 |
| 1 | T2 | 0 | 1 |

| -continued | | |
|---|---|---|
| Validation inputs | BPJE2N | 0 |
| | 176 | 177 |

The upper line in this table indicates from left to right: BPJ is the signal applied to the input J of the trigger 163, BPK being the signal applied to the input K of the trigger 163, CW1 being the signal applied to the address selection input of the multiplexer 162, and CPU being the second signal applied to the second address selection input of the multiplexer 162.

The lower line of this table shows the signal present on the two validation inputs 176 and 177. On the input 177 the logic signal "0" is always present, while the signal BPJE2N is applied to the input 176, the logic representation of which is:

$$BPJE2N = T1.SCANN\,(\overline{CW2} + TRMN.TMPENM)$$

This signal BPJE2N, which is low when it is active, enables the sequence circuit to be blocked in the case, for example, of overlapping with a new exchange when the slave units are still occupied by the previous dialogues. This condition BPJE2N clearly indicates that the output Q of the trigger 163 supplies a logic signal 0 only if the signal T1 itself equals 1 and if the cycle is other than the sampling cycle SCANN. Another condition is imposed: either $\overline{CW2} = 1$, or TRMN and TMPENB equal 1. The condition $\overline{CW2} = 1$ indicates that, for example, a cycle other than the cycle CW2 is involved, while the condition TRMN.TMPENB indicates that on the one hand the anser of the store during the previous exchange has been terminated, and that the input/output processor has already addressed the peripheral unit of the next exchange. In the case of the cycles CPU and CW1, the shifting from the trigger 159 to the trigger 163 is directly effected.

During the cycle CW2 a loop exists for the waiting for the reply of the peripheral unit, this loop being interrupted when the signal TPMNRA becomes 1. This signal TPMNRA is the signal TPMN which has passed an inverter and which has been delayed a given time interval.

The resetting to 0 of the output Q of the JK trigger 163 is effected synchronously in reaction to the next positive-going edge of the oscillator OSC, this resetting to zero being determined by the signal T3 during the cycles CW1 and CW2 and by T2 in the cycle CPU. The shifting of the pulses from the one trigger to the other trigger is unconditionally continued after the cycle BP in reaction to the positive-going edges of the oscillator OSC. As is shown in FIG. 5a, when the trigger 166 has received the pulse originating from the trigger 164, the said trigger 166 subsequently copies the value of its own output Q on its own input D. This allows a waiting loop to be obtained during the cycles CPU and CW2. This trigger 166 is reset to 0 again in reaction to the positive-going edge of the oscillator OSC when the next trigger has been set to 1.

This next trigger will be the trigger 156 in the case of a cycle CPU or a cycle CW1, and the trigger 172 in the case of a cycle CW2. These waiting loops will be described with reference to the FIGS. 5f, 5h and 5i.

In the case of a cycle CW2, the sequence circuit remains blocked until the reply of the store, i.e., the signal TRMN, reaches the input/output processor. When this signal reaches the inverter 169, it sets the trigger 170 and the AND-gate 171, the three inputs of which are 1 (because a cycle CW2 is concerned). The trigger 172 then supplies the signal T4 on its output Q and the shift is continued to the triggers 173 and 174. Because the trigger 173 receives the signal originating from the output Q of the trigger 172, the said trigger 173 is set only one half period after the trigger 172.

The pulse T4 provides synchronization after reception of the reply from the store, T5 determining the end of the command to the peripheral unit, with the result that the data lines can be validated in the case of reading, while T6 ensures proper termination of the dialogue with the store and the releasing of the bus.

II. DESCRIPTION OF THE OPERATION OF THE SEQUENCE CIRCUIT

The selection circuit for the operation modes of the sequence circuit is shown in FIG. 5b; this circuit is a control circuit of the sequence circuit SEQU which is shown in FIG. 5a and enables the determination of the execution cycle of the sequence circuit. As is shown in FIG. 5b, the NAND-gate 180 receives the signals MSN, BSYL and ENB. The outout of the said gate 180 is connected to the input D of the trigger 181, the clock input of which receives the signal AP originating from the trigger 156 of FIG. 5a.

The output Q of the said trigger 181 is connected to a first input of the NAND-gate 185 which supplies the signal SCANN. The signal of the output $\overline{Q}$ of the said trigger 181 produces the signal CW1. On its input D, the trigger 182 receives the signal TMPX, and on its clock input it receives the signal AP. Its output Q supplies the signal CW2, while its output $\overline{Q}$ is connected to a second input of the NAND-gate 185.

The NAND-gate 183 receives on the one side the signal AK and on the other side the signal originating from the output Q of the trigger 184. The output of the said NAND-gate 183 is connected to the input D of the trigger 184, the clock input C of which receives the signal AP. The output $\overline{Q}$ of the said trigger 184 supplies the signal CPU, while the output Q of the said trigger is also connected to a third input of the NAND-gate 185. The operation of this circuit is as follows:

the trigger 181, controlling the cycle CW1, supplies a signal having the logic value 1 on its output Q if the following three conditions are satisfied:

the input/output processor is the master of the bus (MSL = 1 - MSL is the signal originating from the output Q of the trigger 217 in FIG. 5d)

the bus is occupied by the said input/output processor (BSYL = 1 - BSYL is the signal originating from the output Q of the trigger 220 in FIG. 5d)

the signal ENB is 1 (FIG. 5e - the signal ENB originates from output Q of the trigger 236), which mean that the dialogue between the two units has not yet been started, this latter condition enabling a distinction to be made between the exchange cycles CW1 and CW2. The trigger 182 which controls the cycle CW2 supplies a signal having the logic value 1 on its output Q, provided that the signal TMPX is 1. This signal TMPX is generated by the trigger 242 in FIG. 5a.

The trigger 184, controlling the cycle CPU, supplies a 1-signal on its output $\overline{Q}$ if the address recognition signal AK of the external registers of the input/output processor is 1 and if the trigger 184 does not previously supply a signal 0 on its output Q.

This condition ensures that a second cycle CPU is prevented in the case where the delay time of the address validation signal TMEN of the external registers (this signal is in this case dispatched by the central unit to the input/output processor) is too large for applying the data to the bus before the appearance of the signal AP.

In the case where none of the signals CW1, CW2, CPU equals 1, the outputs Q of the trigger 181, $\overline{Q}$ of the trigger 182, and Q of the trigger 184 supply signals having the logic value 1.

This means that the NAND-gate 185 supplies a signal SCANN having the logic value 0. In that case a sampling cycle SCANN is taking place, because the said signal SCANN has the logic value 1. As has already been described with reference to FIG. 5a, this case corresponds to a succession of pulses AP and T1, which is interrupted only when the cycle changes (FIG. 5g).

III. ADDRESS RECOGNITION UNIT CPURQ.

This unit is diagrammatically shown in FIG. 5c. The lines MAD 08, MAD 09, MAD 10, MAD 11, being the address lines of the bus, pass through the inverters 202, 201, 200, 199, respectively, and are connected to the inputs A0, A1, A2 and A3, respectively of the comparison circuit 191. On the other side, the inputs B0, B1, B2 and B3 of the comparison circuit 191 receives the signals 1 by way of the resistor 193, and the signals supplied by the interrupters 195, 196 and 197, respectively. The said interrupters 195, 196, and 197 enable the coding of the correct combination for the address-recognition of the input/output processor upon request. To this end, the said interrupters may be connected either to:

the common earth line 198 (logic level 0) or the common supply line by way of the resistor 194 (logic level 1).

The validation input V of the said comparison device 191 receives the signal TMEN from the bus. When the comparison result is the same line per line, i.e., A0 with B0, A1 with B1, A2 with B2 and A3 with B3, the said comparison device 191 applies a signal, as soon as the signal TMEN is received, which has the logic level 1 to the trigger 190, which will produce the signal AK on its output Q in reaction to the next positive-going edge of the oscillator OSC. This signal will have the logic value 1 if an equality exists between B0, B1, B2, B3 and A0, A1, A2 and A3. This trigger will be reset to zero as soon as the signal RMEN is suppressed.

IV. BUS CONTROL REQUEST UNIT BUSCTR

This unit is described with reference to FIG. 5d. The NAND-gate 211 on the one side receives the signal BUSRZIN (see FIG. 5e), and on the other side the signal originating from the NAND-gate 212. The output of the said gate 211 is connected to a first output of the NAND-gate 210, to a first input of the gate 212 and to the input D of the trigger 214.

The NAND-gate 212 also receives the signal originating from the output Q of the trigger 217. The second input of the NAND-gate 210 is connected to the output of the inverter 218 which dispatches the signal BUSRN via the control lines of the bus. The signal SPYC from the bus is inverted by the inverter 213 and is applied to the clock input C of the trigger 215 and to a first input of NAND-gate 215, a second input of which receives the signal originating from the output Q of the trigger 215. A third input of the NAND-gate 215 receives the signal KOI which originates from the lines CONTROL of the bus. The output of the gate 215 supplies the signal OKO via the inverter 216. The signal OKI is applied to the clock input C of the trigger 217, the input D of which receives the signal originating from the output Q of the trigger 215. The output Q of the said trigger 217 is connected on the one side to the inverter 218, the output of which applies the signal MSN to the bus, and on the other side to the input R for resetting the trigger 223 to zero and to the input D of the trigger 220. The clock input C of the said trigger 220 receives the signal T5, and the input S of the trigger 220, reset to 1, is connected to the output of the NAND-gate 219 which receives the signals BSYN, TRMN and TPMN, originating from the bus, as well as the signal originating from the output Q of the said trigger 217.

The output Q of the trigger 220 supplies a signal which is inverted by the inverter 221 and which is applied to the line BSYN of the bus. The R-input for the resetting of the trigger 217 to 0 is connected to the output of the inverter 222, which receives the signal originating from the output Q of the trigger 223.

The said trigger 223 on the one side receives the signal TMRX on its clock input C, and on the other side the logic signal 1 on its input D.

The signal TMRX originates from the output Q of the trigger 250, the input C of which receives the signal OSCN and the input D of which is connected to an AND-gate 251, which receives the signals T2 and CW2. This signal TMRX is inverted by the inverter 252 and is applied via the bus line TMRN.

The operation of this circuit is as follows:

As is shown in FIG. 5e, when the input/output processor has detected an exchange request originating from a peripheral unit, the signal BUSRZIN assumes the value 0. The s signal BUSRN is then dispatched via the bus, provided that the signal MSN is not active on the bus (this bus is active when it is low). The said signal BUSRN enables the bus control device to generate the signals SPYC and OKI. The signal BUSRZIN sets the trigger 214 such that the signal on the output $\overline{Q}$ of the said trigger 214 becomes 0.

The signal OKI which arrives in the unit BUSCTR via the bus, consequently, cannot pass the gate 215 and the signal OKO remains 0.

The output Q of the trigger 214, set to 1 by the signal BUSRZIN, enables the output Q of the trigger 217 to supply a signal having the logic level 1 as soon as the signal OKI has been received. This s signal is inverted by the inverter 218 and the signal MSN (active when low) is dispatched via the bus, and indicates that the input/output processor is now the master of the bus. The output Q of the trigger 217 also applies a logic signal 1 to the input D of the trigger 220.

It is assumed that the input/output processor has not been selected as the master of the bus for the previous exchange. This means that the signal originating from the output Q of the trigger 220 was 0 prior to the selection of the master of the next exchange. This is because the local trigger BSYL at this instant applies a signal 1 on the line BSYN after the inversion by the gate 221. As soon as the previous exchange has been terminated, which means that the three signals TPMN, TRMN and BSYN of the bus are 1, the signal MSL originating from the output Q of 217 itself being 1, the output of the gate 219 is set to 0. The input S of a trigger is such that, as soon as the signal level on this input becomes 0, the output Q of the said trigger becomes 1. This implies the dispatch of a 0-signal on the line BSYN after inversion by 221: the bus is now occupied by the processor. The output Q of the trigger 220 remains at the level 1 at least until the next clock pulse T5. When this pulse arrives, two cases may occur:

either the input/output processor is again selected as the master of the next exchange, because the signal MSN has already become high again, if BUSRZIN has again become 0, so that the output Q of the trigger 217 can become 1 again. In this case the output Q of the trigger 220 remains at the level 1 because of the pulse T5, and the signal BSYN remains at the level 0. The bus is occupied again by the input/output processore which then operates in the mode blocked interruption ("break").

or the master of the next exchange is not the input/output processor. In this case the output Q of the trigger 217 is at the level 0, which means that when the pulse T5 arrives, the output Q of the trigger 220 changes over to the level 0 and the signal BSYN, generated by the input/output processor, returns to the level 1. The processor then is not the master of the bus for the next exchange.

V. SAMPLING UNITS CUREQ FOR THE REQUESTS ORIGINATING FROM THE PERIPHERAL UNITS

This unit is shown in FIG. 5e, in which the lines BRO0N to BRO7N are the special lines, each of which originates from the eight peripheral units connected to the input/output processor.

These exchange request lines are connected to the NAND-gate 233. The output thereof is connected to the NAND-gate 234 which supplies the signal $\overline{BUSRZI}$ (or BUSRZIN).

The second input of the said gate 234 is connected to the output Q of the trigger 236 which supplies the signal ENB and to a first input of the AND-gate 235, the other input of which receives the clock signal AP.

The clock input of the said trigger 236 receives the signal OSC, and its input I receives the signal originating from the AND-gate 238, the input signals of which are formed by the signals T2 and CW2, and its input K receives the signal originating from the AND-gate 237, the input signals of which are formed by T1 and CW1. The output of the AND-gate 235 is connected to the clock inputs of the circuits 230 and 321. The circuits 230 and 231 may be, for example, of the type 74175, which is to say circuits which each comprise 4 bistable triggers of the type D; the data inputs thereof are denoted by DA1, DW1, DC1, DD1 and DA2, DC2, DB2, DD2, the outputs being denoted by QA1, QB1, QC1, QD1, QA2, QB2, QC2 and QD2.

The logic signals present on the lines BRO0N to BRO7N are taken up by the said circuits 230, 231 when the signals ENB and AB are 1.

These circuits are connected to the priority coding device 232, which comprises 8 inputs which are numbered from 0 to 7 in FIG. 5e and three outputs A0, A1 and A2.

This priority coding device is capable of assigning a binary combination of three bits, appearing on the output, to the corresponding input signal. For example, if two exchange requests are present on the lines BRO0M and BRO5N, a logic signal 0 will be present on the input 7 and on the input 2 of the said priority coding device.

This coding device, being, for example, of the type 74148, determines the request having the highest priority, in this case the request present on the input 7, and applies a binary combination 000 (binary 0) to the output A0, A1, A2.

As long as the signal ENB is 1, for each clock signal AP the values of the lines BRO0N and BRO7N will be sampled by the clock inputs C of the circuits 230 and 231, so that the exchange requests originating from the peripheral units can be updated.

The signals supplied on the lines BRENC2N, BRENC1N, BRENCON, originating from the priority coding device 232, supply the address of the peripheral unit which has submitted a request for an exchange and which has the highest priority level. The contents of these three lines determine the three bits having the lowest weight of the address of the peripheral unit which has requested an exchange, and the three bits having a higher weight of the address of the process register which forms part of the unit CWQG and which corresponds to the relevant peripheral unit.

The operation of these different units and of the input/output processor, described with reference to FIGS. 5a to 5e, will now be described in detail with reference to the FIGS. 5f to 5i which illustrate the completion of the exchanges in the various cycles SCAN, CW1, CW2 and CPU.

VI. CYCLE CPU (OR CYCLE CENTRAL UNIT)

The completion of this cycle is shown in FIG. 5f. After reception of the signal TMEN, the signal AK becomes 1 in reaction to the next positive-going edge of the oscillator OSC.

The pulse AP terminates at the instant at which the pulse T1 starts; the sampling cycle SCANN terminates as soon as the signal CPU becomes high after the appearance of the next pulse AP. The pulse BP is subsequently generated, after the rising of the signal T1 of the oscillator OSC, in reaction to the negative-going edge. Th pulses T2 and T3 subsequently succeed each other.

The cycle CPU starts with the positioning of the trigger supplying the signal CPU.

The addressing of the external register involved in this cycle is determined by the contents of the lines MAD 12 to 15, these address signals being dispatched by the central unit and stored in a register (not shown in the Figure) which is updated in reaction to each pulse AP. The arithmetic and logic unit ALUP of the input/output processor is then set to the logic transfer mode as to allow the central unit to transfer the control word via the lines BIO.

The writing sequence in the register is then given, except for the case of a read instruction RER where the address line MAD 04 is 1.

In the case of writing in one of the external registers, the data are present on the lines BIO when the signal TMEN becomes low, while in the case of a read instruction RER in one of these external registers, the input/output processor dispatches the contents of the said register via the lines BIO when it has received and recognized the validation signal TMEN of its address. In the example shown in FIG. 5f, the data are present on the lines BIO a few moments before the rising of the signal T1 of the cycle CPU. These data are taken into account at the instant at which the signal TMEN becomes high.

The rely signal of the input/output processor TRMN is applied to the central unit, via the bus, a few moments before the start of the pulse T3.

When the sequence circuit has proceeded to the pulse T3, it blocks itself in a waiting loop and waits for the end of the dialogue signal, i.e., until the signal TMEN of the master of the exchange (central unit) becomes 1 again. The signal TMEN terminates only after the central unit has received the rhythm signal TRMN as a reply from the input/output processor.

This is because as of this instant, and in synchronism with the oscillator OSC, the state of the trigger supplying the signal CPU changes, so that by means of the multiplexer 162 (FIG. 5a) the trigger 166 is made to leave its waiting loop and the signal T3 becomes low. The signal AK becomes low again (FIG. 5c) when the signal TMEN on the bus becomes high. This causes the sequence circuit (FIG. 5a) to change the cycle.

VII. SAMPLING CYCLE

During this cycle, the input/output processor scans the exchange requests by means of the circuit of FIG. 5e. As long as such an exchange request has not been detected and as long as a central unit cycle has not been accepted, the sampling cycle continuous the successive generation of the pulses AP and T1 as shown in FIG. 5g. This cycle is the normal waiting cycle of the input-/output processor when it is not occupied by an exchange via the bus.

VIII. EXCHANGE CYCLE

The signals exchanged by the various units will be described with reference to FIGS. 5h and 5i.

A. UNITS INVOLVED IN THE DIALOGUE

The exchange mode is a mode in which the input/output processor is the master of the system, and controls the exchange of data on the bus between two slave units. Each exchange comprises two cycles, CW1 and CW2, which are associated with the two described control words which bear the same reference.

The priority coding device of the unit CUREQ generates the address of the peripheral unit under consideration, and the address of the control word relating to the peripheral unit. The reading of the first word indicates the type of transfer (input or output), the transfer mode (character or word), the length of the block to be transferred and whether or not this transfer is the last one.

B. EXECUTION OF THE CYCLE CW1 (FIG. 5h)

The trigger BSYL 220, being the local trigger of the processor and enabling an occupied signal to be generated on the line BSYN of the bus, is set to 1 (in a manner already described above) at the end of the previous cycle (CW2, CPU or SCAN), if the input/output processor has requested the bus and if there is no other unit, having a higher priority, which has submitted a request. In reaction to the next positive-going edge of the oscillator OSC, the trigger which supplies the signal AP and the trigger supplying the signal CW1 are set.

The address of the first control word in the set of registers CWRG is generated by the priority coding device of the unit CUREQ, and the arithmetic unit ALUP is positioned to the mode minus 1, which means the mode which allows 1 to be subtracted from the bits 04 to 15 of the first control word.

The updating of the length of the block to be transferred is ensured as long as the clock pulse BP is present, while the new value of the block length is reinserted in the corresponding control word of CWRG in reaction to the negative-going edge of BP.

The signal ENB is reset to zero (FIG. 5e) when the signals T1 and CW1 are simultaneously high in reaction to the negative-going edge of the next clock pulse of OSC.

The address of the unit participating in the next exchange is determined by the value of its priority level (lines BRENCOON to BRENCO2N) associated with the number of the processor. The type of transfer (input or output) and the signal indicating the end of the block to be transferred (detected by the unit EORDE), which are signals which are transmitted via the address lines MAD 04 and MAD 03, respectively, for each transfer, are fetched from a small auxiliary register (not shown), with the result that address signals in the direction of the peripheral unit can be very quickly generated.

The rhythm signal TMPN, generated by the input-/output processor in the direction of the peripheral unit, becomes low a few instants after the address of the peripheral unit has been applied to the lines MAD, this address then being validated by the negative-going edge of the said signal TMPN.

Without waiting for the reply from the peripheral unit, the input/output processor subsequently starts the second exchange cycle CW2. This cycle commences when the trigger 182 of FIG. 5c is positioned, i.e., when the signal TMPX becomes high and the signal AP is received on the clock input of the said trigger.

C. EXCHANGE CYCLE CW2 (FIG. 5i)

The cycle CW2 is determined by the clock pulse AP, under the condition that the dialogue with the peripheral unit has already started, which means that the signal TMPN is active (as already described).

The address of the second control word is then applied to the address register of the set of registers CWRG. This second control word contains the address of the storage word by means of which the transfer has been made. In order to obtain the next address, the arithmetic unit ALUP is set to the mode plus 1, which means that the contents of the second control word are applied to the unit ALUP, while 1 is added to these contents if the transfer is performed per character, and 2 is added if the transfer is effected per word. The sequence circuit is then blocked for the generation of the clock signal BP for as long as the reply signal TPMN from the peripheral unit has not reached this circuit. In FIG. 5i, part of the pulse T1 is denoted by broken lines, which means that the duration of this pulse may be indefinite. When the peripheral unit gives a reply (reception of TPMMN) and if these is no further active reply from a previous exchange from the store (which means that a signal TRMB is low), the pulse BP allows the effective address of the store to be read in the unit BUFFER of the input/output processor, this address then being dispatched via the lines MAD. The control signal TMRN is then applied to the store.

The signal ENB becomes 1, with the result that the exchange requests originating from the peripheral units can be again considered in accordance with their relevant priority.

The trigger which supplies the signal MSL in the input/output processor is set to 0, which means that the signal MSN becomes 1, with the result that the selection of the next master of the next exchange can be effected. This selection is performed simultaneously with the execution of the cycle CW2.

FIG. 5i shows that a second waiting loop exists (broken vertical line, at the right in the said Figure) which serves for waiting for the reception of the reply signal TRMN from the store. In the case of a read operation in the store, this signal serves to validate the data on the lines BIO, while in the case of write operations the said signal releases the lines BIO.

The rhythm signal TMPN of the input/output processor in the direction of the peripheral unit then becomes inactive again after a given period of time, so that the peripheral unit has the opportunity of taking into account the data present on the lines BIO in the case of a transfer from the store to the peripheral unit.

In the case of an output operation, the positive-going edge of this signal TMPN validates the data on the lines BIO. If the input/output processor is selected as the master of the bus for the next exchange, the said bus thus retains the said processor and a new exchange commences before the end of the previous exchange. This is shown in FIG. 5i, which demonstrates that after the end of the pulse T4 the signal AP becomes active again while the signals T5 and T6 are being generated.

If this signal is generated when the conditions for setting to 1 are present again, this type of exchange, referred to as blocked exchange, allows the successive completion of the cycles CW1, CW2 and subsequently CW1, CW2 etc.

As described, this data processing system comprises master units (central unit, input/output processors in given cases) and slave units (pheripheral units, store and input/output processors in given cases). The exchange of rhythm signals between the master units and the slave units is dependent of the nature of these units. In the case of a data exchange between a peripheral unit and the store, i.e., an exchange which is controlled by an input/output processor, these three units participate in the dialogue.

What is claimed is:

1. A data processing system comprising
a central processor unit;
a random-access store unit; connected to said central processor;
a group of peripheral units for conveying address information, control information and data;
an I/0 unit for processing input/output commands and for controlling the exchange of data to one of peripheral units of said group of peripheral units;
a bus for connecting said processor unit and each of said other units in parallel, said processor and said I/0 unit each having a relative priority in the system;
request means in said central processor unit and in said I/0 unit for generating a request signal in order to gain control of the bus;
selection means in said bus for selecting the unit having the highest priority which has generated a request signal;
means in said central processor unit for successively initiating the I/0 unit for processing the input/output commands, and ones of said peripheral units which will be requested to perform a task by the program currently being executed in the central processor unit;
means for requesting an exchange in each peripheral unit, and for generating an exchange request signal for the said unit for processing the input/output commands, said request signal being transmitted over a special line;
detecting means in said I/0 unit for processing input/output commands for detecting the exchange request signals originating from one of said peripheral units for generating a request to gain control over the bus, after detection of the presence of at least one of said request signals;
I/0 processing means in said I/0 unit for connecting, via the bus, said peripheral unit to the random-access store for executing and controlling a data transfer between said peripheral unit and said central processing unit;
interruption request means in each peripheral unit which, after completion of an information transfer from or to said peripheral unit, generate an interruption signal in order to signal the central unit that the transfer has been completed;
an interruption bus along which said peripheral units and said central processor unit are connected in parallel, each peripheral unit and the central processor unit having a relative priority within the system, each unit being capable of dispatching, independent of any other activity occurring on the bus, an interruption request signal to the central unit so as to interrupt the completion of the current program in the central unit, the task of the unit having the highest priority and having submitted an interruption request signal then being performed first; and
means for addressing said peripheral units and said random access store unit and which, after the said processing unit has gained control over the bus, successively addresses, in the case of a data exchange between the central store and said peripheral units, said peripheral unit and subsequently the central store via the common address lines of the bus, all data being taken into account in the case of the transfer of data from said peripheral unit to the central unit, as of the instant at which said peripheral unit dispatches a receive signal to said one I/0 unit processing the input/output commands, while in the case of a transfer of data from the central store to said peripheral unit, said data are taken into account as of the instant at which the central store dispatches a receive signal to the unit processing the input/output commands, the data exchange between the store and said peripheral unit being performed in a multiplex mode.

2. A system as claimed in claim 1, wherein said system comprises internal registers in said central processing unit, and exchange registers in the input/output process of said internal registers being commonly used registers containing own information as regards the current program in the central unit, while said external registers contain own information as regards the data transfers between the store and the peripheral units.

3. A system as claimed in claim 2, wherein the various units of the system comprises means which can react to three different types of instruction: the instructions for control and processing of the data in the central unit, the input/output instructions and the read and write instructions in the external registers, the former instructions serving for all arithmetic, logic and exchange operations between the store for the data exchange between the central unit and the peripheral unit, and the third instructions serving for the transfer of data between the internal registers and the external registers, the data stored in these external registers, under the control of the input/output processor, being the parameters necessary for the transfer between one of said peripheral units and said store.

4. A system as claimed in claim 1, wherein each peripheral unit contains means for generating a binary coded interruption request on the interruption lines, the interruption unit, situated in the central unit, effecting the comparison between the priority level of the request of a peripheral unit and the priority level of the current program in the central unit which is coded in a section of the status word of the central unit, the result of this comparison, when the priority level of the peripheral unit is higher than that of the current program, being translated as an interruption of the said program and the continuation of an interruption program, the starting address of which is present in the storage word whose address is obtained by inserting the priority level in the address register of the central unit in the right-hand section of this register and by inserting zero in the other locations of this register.

5. A system as claimed in claim 1, wherein said input/output processors comprise an arithmetic and logic unit, having a first and second input, and an output connected to a set of external registers for transferring their contents to said first input of said arithmetic unit, said second input receiving the data originating from the bus, the said bus also transferring the requests coming from the central unit to a sequence circuit which controls the arithmetic unit and the external registers in the rhythm of an oscillator.

* * * * *